(12) United States Patent
Hooton

(10) Patent No.: US 7,110,432 B2
(45) Date of Patent: Sep. 19, 2006

(54) ORTHOGONAL CHIRP MODULATION IN MULTIPATH ENVIRONMENTS

(75) Inventor: Thomas R. Hooton, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 907 days.

(21) Appl. No.: 10/047,325

(22) Filed: Jan. 14, 2002

(65) Prior Publication Data

US 2003/0133496 A1 Jul. 17, 2003

(51) Int. Cl.
*H04B 1/69* (2006.01)

(52) U.S. Cl. ............... 375/139; 375/150; 375/152; 375/302; 375/322

(58) Field of Classification Search ........... 375/139, 375/150, 152, 302, 322; 385/37, 39
See application file for complete search history.

(56) References Cited

U.S. PATENT DOCUMENTS

| | | | | | |
|---|---|---|---|---|---|
| 3,423,754 | A | * | 1/1969 | Gunn | 342/132 |
| 4,748,639 | A | | 5/1988 | Feggeler | 375/58 |
| 5,297,186 | A | * | 3/1994 | Dong | 375/222 |
| 5,495,432 | A | * | 2/1996 | Ho | 708/313 |
| 5,748,677 | A | | 5/1998 | Kumar | 375/285 |
| 6,047,023 | A | * | 4/2000 | Arnstein | 375/229 |
| 6,049,563 | A | * | 4/2000 | Matsui | 375/139 |
| 6,064,695 | A | * | 5/2000 | Raphaeli | 375/230 |
| 6,091,702 | A | | 7/2000 | Saiki | 370/203 |
| 6,111,538 | A | * | 8/2000 | Schuchman et al. | 342/357.12 |
| 6,218,896 | B1 | * | 4/2001 | Becker et al. | 329/304 |
| 6,498,822 | B1 | * | 12/2002 | Tanaka | 375/354 |
| 6,600,774 | B1 | * | 7/2003 | Otto | 375/139 |
| 6,618,125 | B1 | * | 9/2003 | Stann | 356/5.09 |
| 6,940,893 | B1 | * | 9/2005 | Pinkney et al. | 375/139 |
| 6,963,599 | B1 | * | 11/2005 | Dunn | 375/132 |
| 7,012,883 | B1 | * | 3/2006 | Jalali et al. | 370/208 |
| 2002/0009125 | A1 | * | 1/2002 | Shi | 375/139 |
| 2002/0048012 | A1 | * | 4/2002 | Stann | 356/5.09 |
| 2003/0054816 | A1 | * | 3/2003 | Krebs et al. | 455/428 |
| 2003/0104831 | A1 | * | 6/2003 | Razavilar et al. | 455/522 |
| 2003/0223689 | A1 | * | 12/2003 | Koch et al. | 385/37 |

OTHER PUBLICATIONS

Martone, Massimiliano. *A Multicarrier System Based on the Fractional Fourier Transform for Time-Frequency-Selective Channels.* IEEE Transactions on Communications, vol. 49, No. 6, Jun. 2001.

* cited by examiner

*Primary Examiner*—Kevin Burd
*Assistant Examiner*—Freshteh N Aghdam
(74) *Attorney, Agent, or Firm*—Steven A. Shaw; W. James Brady; Frederick J. Telecky, Jr.

(57) ABSTRACT

Methods and systems for communication systems are disclosed. Chirp signals generated according to a chirp rate and carrier frequency are used for communication. The chirp rate can be determined by solving integrals or by simulation of transmission parameters. A chirp signal is transmitted from a base station and delayed versions of the chirp signals are created. The delayed versions are generated by the chirp signal reflecting off of reflectors. A receiving station receives an incoming signal. The incoming signal includes the LOS signal plus delayed versions, noise and/or interference. Unwanted signals, either LOS or delayed versions, noise and/or interference are removed from the incoming signal to obtain the desired chirp signal. Using the chirp rate, the chirp signal is converted to a corresponding digital signal.

25 Claims, 22 Drawing Sheets

ORTHOGONAL CHIRP MODULATION IN MULTIPATH ENVIRONMENTS

TECHNICAL FIELD

The present invention relates generally to communications and, more particularly, to systems and methods for orthogonal chirp modulation for communications in multipath environments.

BACKGROUND OF THE INVENTION

Various techniques have been developed to facilitate communication of data signals over an associated communications path. The particular communications protocol employed generally depends on the transmission medium, the available bandwidth resources, and other design considerations. Regardless of the type of communications system being employed, noise, distortion and multipath interference are often introduced into data signals transmitted over an associated communications path, including both wired and wireless systems.

Multipath interference is the unwanted addition of one or more signals to a desired signal. Multipath signals are generated by reflectors such as buildings, cars, signs, etc., which the signal bounces off of generating a delayed, attenuated and phase shifted signal. At the receiving antenna, the net received field is the sum of all incoming electromagnetic energy including both the desired signal and the multipath signals.

FIG. 1 illustrates destructive multipath interference. FIG. 1 shows graphs of a desired or line of sight signal 101, a received signal 102 and a multipath signal 103. The multipath signal 103 is shown as a "worst case" multipath signal having a differential path delay of one half of a carrier period. The differential path delay is the difference in delay between the desired and/or line of sight (LOS) signal and a multipath signal. Because of multipath interference, the received signal 102 is approximately flat because the desired signal 101 is canceled by the multipath signal 103.

Communication systems generally have fixed stations or mobile stations. For fixed station communication systems, multiple antennas can be spread out and spaced apart so that multipath signals causing destructive interference at one antenna will not cause the same destructive interference at another antenna. This technique is commonly referred to as using spatial diversity. However, spatial diversity is not usually feasible for mobile station communication systems. For example, a wireless telephone system would not work well if a user was required to set up multiple antennas spaced apart from each other.

A number of methods, aside from spatial diversity, are used to reduce or prevent multipath interference. Included among these methods are quadrature amplitude modulation (QAM) with decision equalization feedback (DEF), direct sequence spread spectrum, frequency division multiplexing (FDM) and orthogonal frequency division multiplexing (OFDM). However, these methods all have problems dealing with multipath interference.

Using QAM with DEF requires a formidable amount of hardware and generally does not work well in dense multipath environments. Once a strong multipath reflection has cancelled the incoming signal, there is nothing remaining in the incoming signal with which to retrieve the desired signal. For signals which are only partially cancelled, an equalizer may provide enough signal to noise ratio improvement for the signals to be processed correctly. However, for strong multipath interference, QAM with DEF does not work well.

The spread spectrum approach will work even in the presence of worst case multipath interference from a single reflector, but requires that the spectrum be spread over a wide band. Generally, a bandwidth of at least twice the carrier frequency will work. Thus, a carrier frequency of 2.5 GHz would require a spread spectrum from 2.5 GHz to 7.5 GHz. Such large bandwidth requirements make this approach not practicable.

The strongest of the above approaches is OFDM, a form of frequency shift keying in which the frequencies transmitted are chosen to be orthogonal to one another. Thus, guard bands are not required to keep one channel from interfering with neighboring channels and delayed signals from other frequency channels will have little or no effect on the desired channel. However, OFDM is problematic in that once a signal has been cancelled by a reflection or multipath interference, the signal is gone unless you apply coding and decrease throughput. OFDM requires coding and time scrambling to get the overall error rate low and thus decreases the net information flow by the additional overhead. In areas with significant multipath signals, a network controller at the base station is generally used to improve the performance of OFDM by dynamically allocating the frequencies to be used for each client transceiver by using special signals such as training signals. The network controller uses the response from the subscribers to the training signals to identify frequencies encountering attenuation and allocates working channels in place of nonworking channels.

However, multipath interference can still break OFDM down. Spatial diversity can be combined with OFDM, referred to as vector orthogonal frequency division multiplexing (VOFDM) to further reduce multipath interference. VOFDM requires that the antennas be positioned so that a deep multipath fade at one antenna will be received as a strong signal at another antenna. By using VOFDM, even though the received signal at one of the antennas may be severely attenuated, in many cases the received signal from the same channel out of the other spatially diverse antenna will be a strong useable signal. However, VOFDM systems are highly complex and require multiple spatially diverse antennas and multiple receiver RF sections, which is costly for fixed communication systems and not feasible for mobile communication systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides systems and methods for implementing orthogonal chirp signals, such as for use in multipath environments. A chirp signal is generated for transmission, such that delayed versions of the chirp signal in a transmitted signal are substantially orthogonal to the chirp signal itself. To facilitate the desired orthogonality, the chirp signal has a chirp rate, which can be selected to reduce transmission errors and mitigate bandwidth usage. When the transmitted signal is received, which generally includes noise and delayed versions due to multipath interference, noise and the effects of the multipath environment can be easily removed to obtain the chirp signal.

Thus, another aspect of the present invention provides a communication system. The system includes a base station, which generates a chirp signal according to a chirp rate and carrier frequency. The chirp signal waveform and parameters can either be determined from simulation and stored in memory for future use or read from memory where it was previously stored. The chirp signal is generated such that delayed versions of the chirp signal are substantially orthogonal to the chirp signal. The base station transmits the chirp signal. A receiving station receives an incoming signal that includes the chirp signal. The receiving station removes noise from the incoming signal. The receiving station also removes multipath signals, which are delayed versions of the chirp signal from the incoming signal. Thus, the desired chirp signal is obtained from the incoming signal.

A method of generating a chirp signal via simulation is also disclosed. Various transmission parameters, including an estimated chirp rate and a minimum differential path delay, are determined. The transmission parameters are implementation dependent. An orthogonal signal is generated according to the transmission parameters such that the desired signal is orthogonal to those delayed versions of itself, which are of delay greater than the minimum differential path delay. Other systems and methods are disclosed.

The following description and the annexed drawings set forth in certain illustrative aspects of the invention. These aspects are indicative, of but a few ways in which the principles of the invention may be employed. Other advantages and novel features of the invention will become apparent from the following detailed description of the invention when considered in conjunction with the drawings.

DETAILED DESCRIPTION OF THE INVENTION

Figure 1:
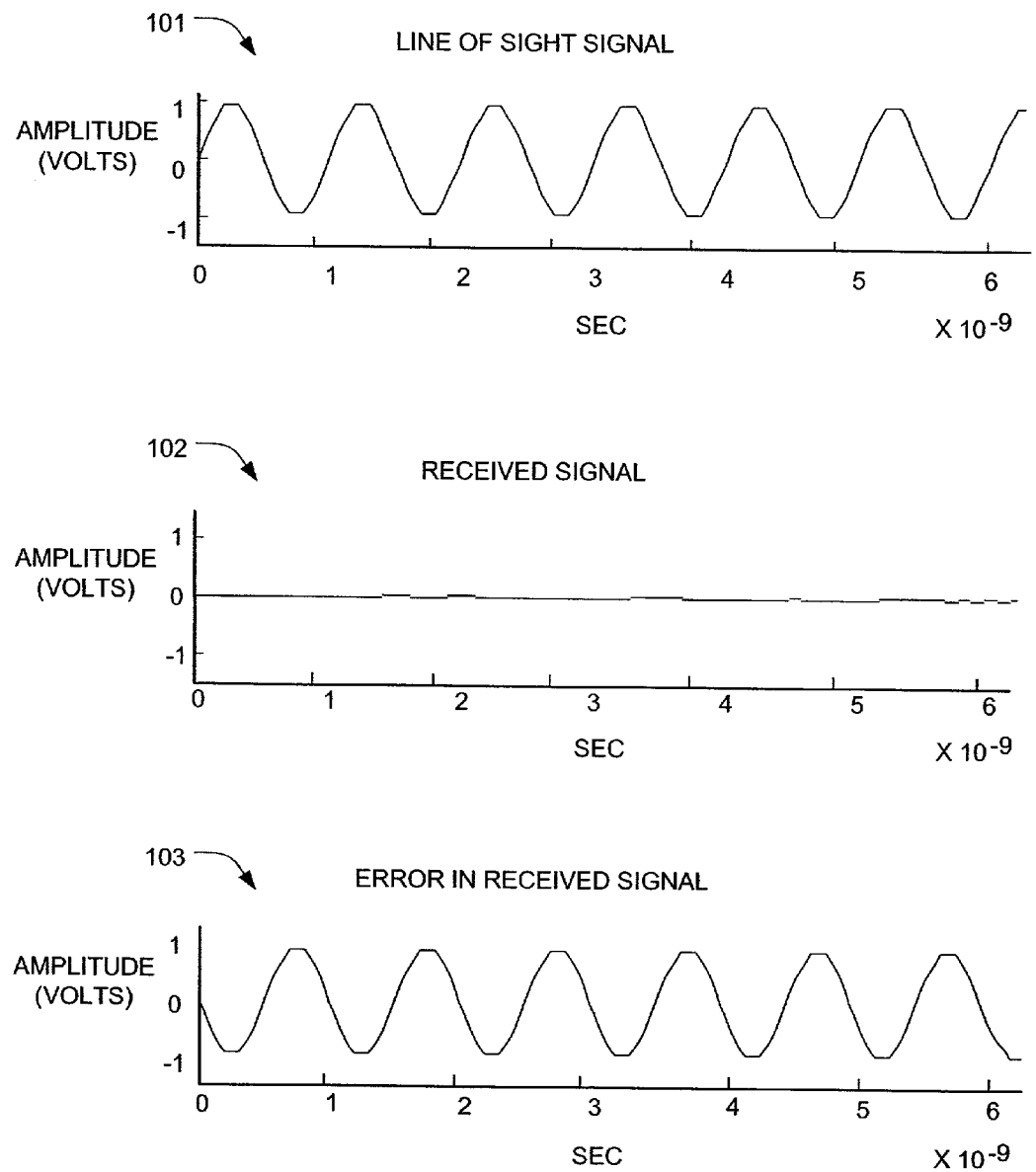
FIG. 1 illustrates destructive multipath interference.
Figure 2:
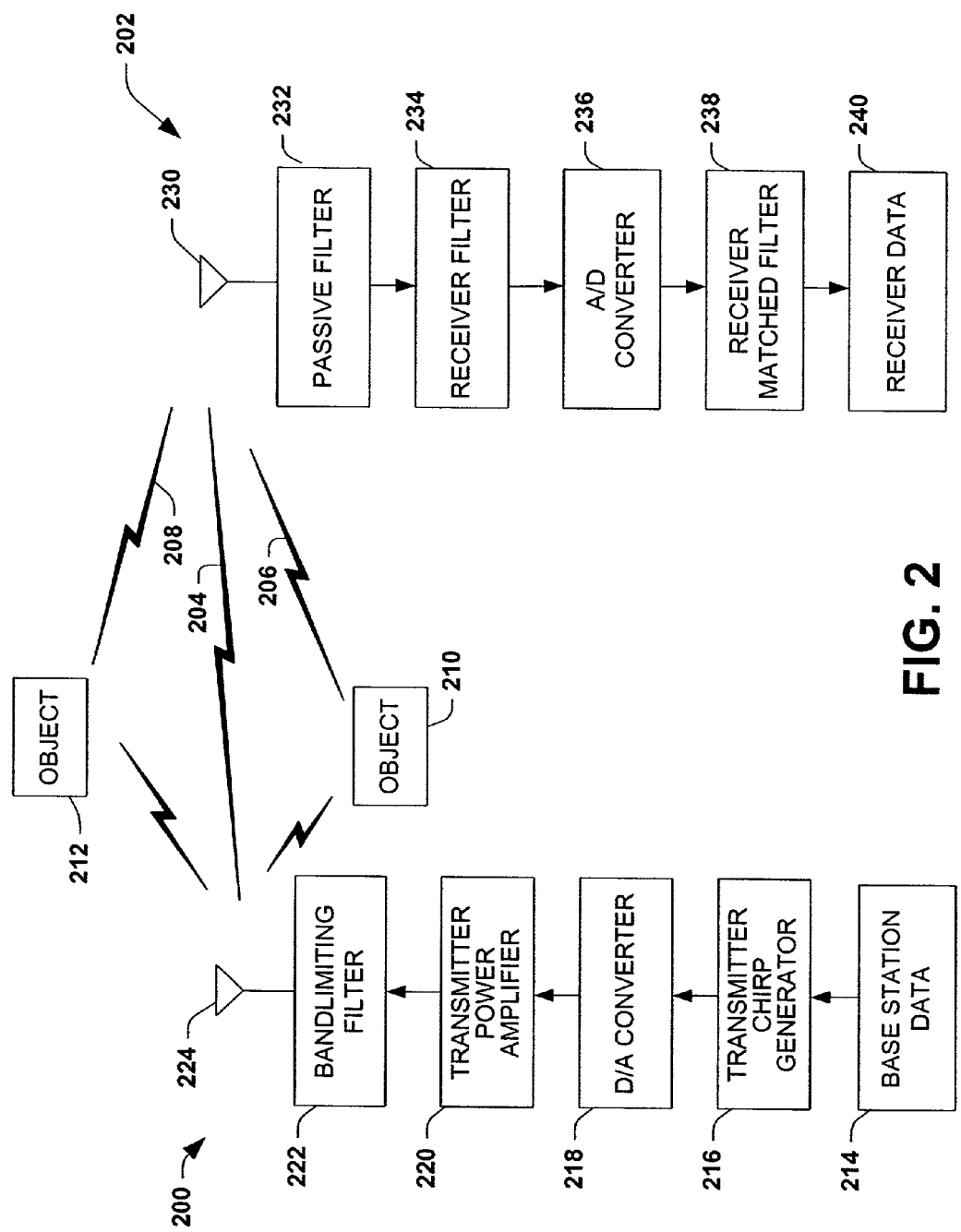
FIG. 2 is a functional block diagram of an orthogonal chirp communication system in accordance with one aspect of the present invention.

FIG. 2 illustrates an orthogonal chirp communication system according to one aspect of the invention. The communication system has a base station 200 and a receiving station 202. The base station 200 employs analog chirp signals to send data from the base station 200 to the receiving station 202. The base station 200 and receiving station 202 can simply be a transmitter and receiver, respectively. The analog chirp signals used are relatively narrowband, which means that the analog chirp signals vary in frequency by less than the carrier frequency. Some typical examples of narrowband frequencies are 1 MHz, 3 MHz, 6 MHz, 10 MHz and the like. However, other frequencies can be narrowband. Additionally, it is appreciated that analog chirp signals that are not narrowband can still be used according to aspects the present invention. The only upper limit on usable frequencies is due to atmospheric conditions causing atmospheric attenuation. For applications without atmospheric attenuation, such as space applications, the upper limit of usable frequencies with the communication system is substantially boundless. Each chirp signal is orthogonal, with respect to phase, amplitude, frequency, time trajectory, and the like, to delayed versions of itself with delay greater than a specified minimum differential path delay.

FIG. 2 shows analog chirp signal 204 along with delayed versions of itself, 206 and 208. Delayed chirp signal 206 has bounced off of one or more objects 210 and delayed chirp signal 208 has bounced off of one or more objects 212. Delayed chirp signal 206 and delayed chirp signal 208 are substantially orthogonal to the analog chirp signal 204. Additionally, delayed chirp signals of the analog chirp signal 204 are orthogonal to each other and the analog chirp signal 204. Furthermore, delayed chirp signals can combine to provide a better or stronger chirp signal to receiving stations. It is appreciated that the term chirp signal refers to a chirp signal, which can be an analog chirp signal and/or a digital chirp signal.

FIG. 2 is illustrated with a single base station 200 and a single receiver station 202 for illustrative purposes only. It is appreciated that multiple receiver stations could receive chirp signals and data from the base station 200 and still be in accordance with the present invention. Furthermore, it is appreciated that multiple base stations can be used and still be in accordance with the present invention. Additionally, it is appreciated that the base station 200 can also include a receiver, and the receiver station 202 can also include a transmitter for bi-directional data flow via chirp signals. The base station 200 can be connected to a wide variety of networks (not shown) such as the Internet, a local area network, a wireless network, a wired network, computer system, phone network, telecommunications network and the like. Likewise, the receiver station 202 can be connected to a wide variety of networks (not shown) such as the Internet, a local area network, a wireless network, a wired network, computer system, phone network, telecommunications network and the like. The base station 200 can be mobile or stationary. Similarly, the receiver station 202 can be mobile or stationary.

Referring to the base station 200, digital data is sent from base station data 214 to a transmitter chirp generator 216. The base station data 214 can be any type of data depending on the base station 200. For example, the base station data 214 can include voice, audio, video, multimedia, program and the like type data. The base station data 214 can include analog and digital data, alone or in combination. Any portion of the base station data 214 that is analog is converted to digital data by an analog to digital converter (not shown) prior to being sent as part of or all of the digital data.

The transmitter chirp generator 216 performs desired digital signal processing on the digital data from the base station data 214 to convert the digital data to a digital chirp signal. The desired digital signal processing can be implementation dependent. The transmitter chirp generator 216 performs modulation using a carrier frequency, a chirp rate and a baud time to convert the digital data into a digital chirp signal. The chirp rate, carrier frequency and baud time are also referred to as signal template parameters. The carrier frequency can also be thought of as an initial carrier frequency. It is appreciated that the signal template parameters can include additional parameters. The signal template parameters are selected to reduce bandwidth usage while maintaining data integrity by reducing transmission errors. The signal template parameters are also used by the receiving station 202 to obtain the digital data. The digital chirp signal can also be referred to as, or having a chirp channel. It is appreciated that phase and/or amplitude modulations such as quadriphase, octaphase, or QAM (quadrature amplitude modulation), or other modulations can be applied to the digital chirp signal by the transmitter chirp generator 216.

The chirp rate is defined in terms of frequency change per sample. There are a variety of approaches of determining or selecting the chirp rate in accordance with the present invention. The first takes note that the chirp signal is required to be substantially orthogonal to delayed versions of itself. Thus, the integral of the product of a worst case delayed signal and the desired chirp signal over a baud time goes to zero. This integral can be solved to find the minimum chip rate, which yields an integral of zero. However, the above computations can be complex. The second approach is to choose values for a variety of transmission parameters and to simulate the result. The values of the parameters can be modified and re-simulated until an acceptable result, including an acceptable chirp rate, is found. Some examples of transmission parameters which affect chirp rate are carrier frequency, number or expected number of multipath signals, the desired direction of the chirp rate, up or down, baud rate, differential path delay, bandwidth availability, and the like.

For ease of illustration, the transmitter chirp generator 216 is discussed with respect to a single stream of digital data and a single digital chirp signal. However, it is appreciated that the transmitter chirp generator 216 is able to receive any number of streams of digital data from the base station data 214 and/or digital data from other base stations (not shown) and convert each into a digital chirp signal using a carrier frequency, chirp rate and a baud time. Each digital chirp signal can be converted using a carrier frequency, chirp rate and a baud time that is unique. Alternately, each digital chirp signal can be converted using a carrier frequency, chirp rate and/or a baud time that has been previously used by another digital chirp signal. Thus, the transmitter chirp generator 216 is able to generate chirp signals using any number of frequency channels and is able to combine any number of digital chirp signals into a composite chirp signal. Furthermore, the transmitter chirp generator 216 is able to combine multiple digital chirp signals into a composite digital chirp signal.

A digital to analog (D/A) converter 218 converts the digital chirp signal to an analog chirp signal. The analog chirp signal is a relatively narrowband signal which is substantially orthogonal to delayed versions of itself, such as when transmitted. It is appreciated that if the D/A converter converts a composite digital chirp signal, the analog signal generated is a composite analog chirp signal, where the composite analog chirp signal is comprised of one or more analog chirp signals corresponding to one or more digital chirp signals that comprise the composite digital chirp signal. Each analog chirp signal of the composite chirp signal is substantially orthogonal to delayed versions of itself and the other analog chirp signals of the composite signal.

A transmitter power amplifier 220 receives the analog chirp signal. The transmitter power amplifier 220 moves the analog chirp signal's carrier frequency up to a desired carrier frequency for that channel and boosts the energy in the analog signal to sufficient level to drive a band limiting filter 222 and base station antenna 224. The moving up of the carrier frequency is also referred to as up-conversion. It is appreciated that in some cases additional filtering may be inserted between the transmitter up-converter and the transmitter power amplifier 220 to avoid unnecessarily amplifying unwanted spurious signals or noise generated by the up-conversion process. The band-limiting filter 222 limits the analog chirp signal to a desired bandwidth. The base station antenna 224 sends the analog chirp signal.

Referring to the receiver station 202, an incoming signal containing the analog chirp signal is received by a receiver antenna 230. It is appreciated that various delayed versions of the analog chirp signal, noise and/or other signals may be included in the incoming signal. Furthermore, the analog chirp signal is not necessarily the line of sight (LOS) signal. A passive filter 232 removes unwanted noise from the incoming signal.

A receiver filter 234 operates on the incoming signal and reduces the frequency to lower values, removes unwanted noise and/or frequencies, and adjusts the signal amplitude to that needed for an A/D converter 236 and provides an analog signal. Generally, the receiver filter 234 is comprised of a down converter, an anti-aliasing filter, and an automatic gain control. However, it is appreciated that the receiver filter 234 can have less or more components. The A/D converter 236 receives the analog signal and converts the analog signal into a digital signal.

A matched filter 238 receives the digital signal and performs signal processing on the digital signal. The matched filter 238 removes unwanted noise, multipath signals, and other in band signals and restores the digital data that was obtained from the base station data by matching the incoming signal to a signal template based on the predetermined carrier frequency, chirp rate, modulation type and baud time and provides a processed and demodulated digital signal. The chirp rate, which is the frequency change per sample, is set to be about equal to the chirp rate used in the transmitter chirp generator 216. Similarly, the carrier frequency, modulation type, and baud time are set to be about equal to the carrier frequency, modulation type and carrier frequency used in the transmitter chirp generator 208. It is appreciated that the matched filter 238 can use a variety of signal template parameters to extract digital data from the digital signal where the digital signal is a composite of a number of digital chirp signals.

Additionally, it is appreciated that the baud time and the available carrier frequencies can be determined by a number of approaches, including, for example, having the base station 200 occasionally transmit a special wideband training timing signal that the receiver station 202 and other receiver stations (not shown) can use to determine the start and decision times for its matched filters, to determine which carrier frequencies are blocked by destructive multipath interferors and to determine which carrier frequencies are helped by additive multipath interferors. During this time the base station 200 does not transmit analog chirp signals, except for the wideband training timing signal. Since the wideband training timing signal covers a much wider range of frequencies, it is orthogonal to more possible multipath signals than the analog chirp signal.

The matched filter 238 can also perform error detection and correction on the digital signal and/or digital data. The digital data forms a part of receiver station data 240. As stated above, the data corresponds to the base station data originally transmitted from the base station 200. For example, the data and/or receiver station data 240 can include voice, audio, video, multimedia, internet, guidance, telemetry, program, network configuration information and the like type data.

The chirp rate, baud time, and carrier frequency or signal template for the matched filter 238 can be obtained in a variety of ways. The chirp rate, baud time, and carrier frequency can be predetermined or assigned for the communication system, received from the base station 200, dynamically determined as one of a range of permitted chirp rates, baud time, and carrier frequencies selected by the receiving station 242, or dynamically determined using coding or training signals from the base station. It is appreciated that other methods of determining chirp rate, baud time, modulation, and carrier frequency can also be used in accordance with the present invention.

Those skilled in the art will understand and appreciate that the communication system of FIG. 2 can have a variety of other components and still be in accordance with the present invention. Further, it is appreciated that the communication system can include additional antennas for the base station and/or receiving station in order to further enhance performance by reducing transmission errors and conserving bandwidth usage. Additionally, the present invention is not limited to one way communications. As mentioned above, a base station can also act as a receiving station and a receiving station can also act as a base or transmitting station to provide two way communications.

Figure 3:
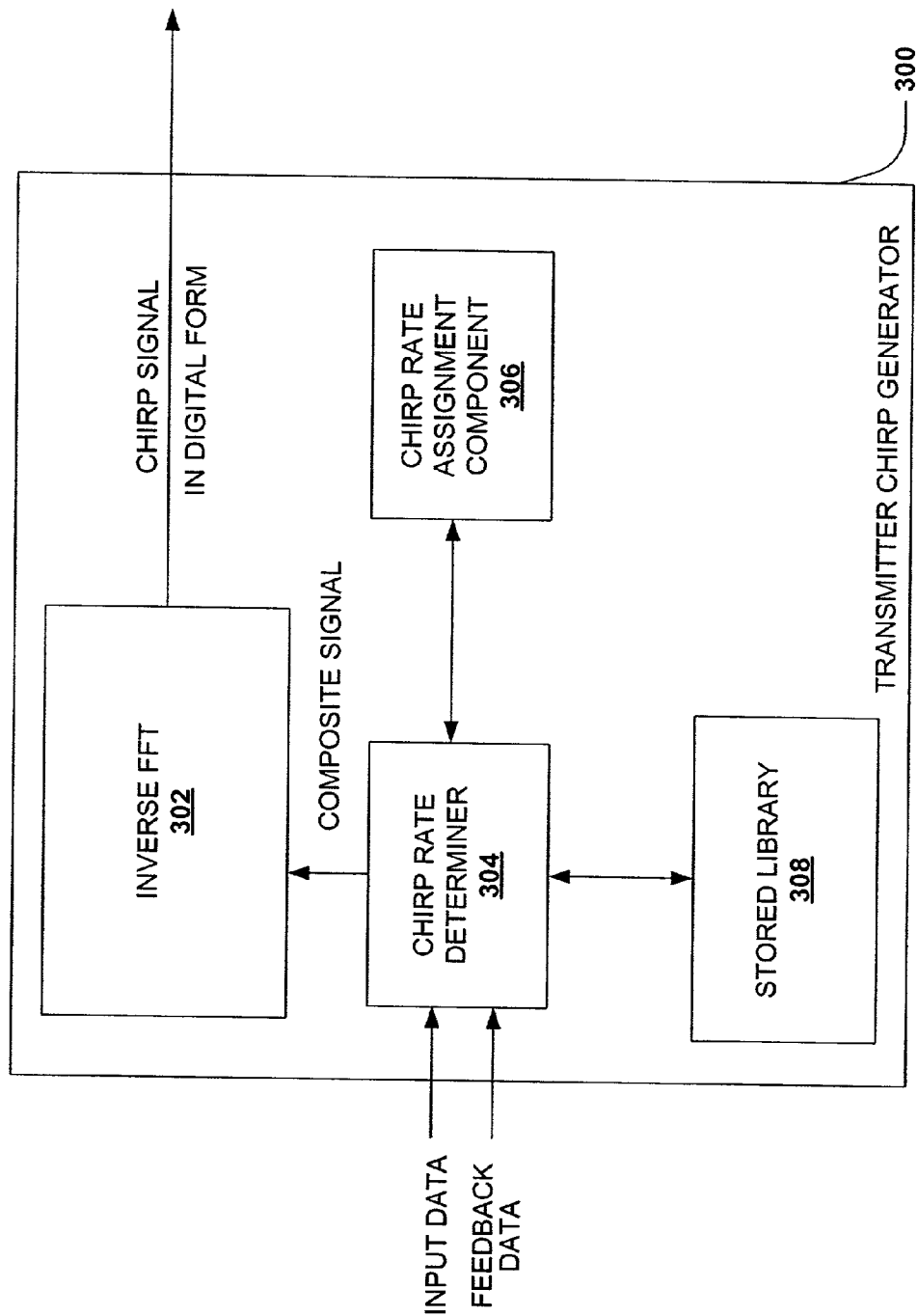
FIG. 3 is a functional block diagram of a transmitter chirp generator according to one aspect of the present invention.

FIG. 3 is a block diagram of a transmitter chirp generator 300 according to one aspect of the invention. The transmitter chirp generator 300 can be used in any communication system, such as, for example, the communication system described with respect to FIG. 2.

A chirp rate determiner 304 receives input data from one or more data channels. Each data channel is an independent data stream with distinguishing characteristics. The characteristics can be pre-assigned by a network controller (not shown). The input data includes an input signal for each input data channel. Thus, an input signal can also be referred to as a data channel. The input data can come from a variety of sources, such as, a number of computers. The input data can also come from a single source. Thus, there is at least one input signal in the input data and each of the at least one input signal can be from a different source or the same source. Also, it is appreciated that network configuration data can also be transmitted in order to keep all of the receivers in time and frequency sync.

The chirp rate determiner 304 identifies the determining characteristics for the at least one input signal, such as can be encoded in the input signal or preassigned. The chirp rate determiner 304 determines assigned channels for the at least one input signal based on the determining characteristics.

The chirp rate determiner 304 determines signal templates for the at least one input signal. Each of the signal templates includes signal template parameters such as chirp rate, carrier frequency, modulation, and baud time. The chirp rate determiner 304 receives signal template parameters assigned to the at least one input signal from a chirp rate assignment component 306. The chirp rate assignment component 306 stores signal template parameters for any number of assigned channels. The chirp rate assignment component 306 returns the signal template parameters for each input signal based on the assigned channels. Typically, the input signals use the same baud time.

If an assigned channel is not stored in the chirp rate assignment component, the chirp rate assignment component 306 can generate signal template parameters, such as for a newly assigned channel. The chirp rate assignement component stores a list or library of available chirp rates, carrier frequencies, baud times, and modulation types, which can be predetermined and dynamically updated and adjusted. The list of available chirp rates, carrier frequencies, baud times, and modulation types is determined such that each of the available chirp rates results in a digital chirp signal substantially orthogonal to delayed versions of itself and to others in the selection set. The list of available chirp rates, carrier frequencies, baud times, and modulation types is determined to reduce transmission and multipath errors and to reduce bandwidth usage. However, there is usually a tradeoff between determining chirp rates to reduce transmission errors and to reduce bandwidth usage. The higher the chirp rate is, the better the resulting chirp signal will be with respect to transmission errors caused by multipath. However, the higher the chirp rate is, the more bandwidth is used by the resulting chirp signal.

There are a variety of methods of determining the available chirp rates in accordance with the present invention. The first takes note that a chirp signal is required to be orthogonal to delayed versions of itself. Thus, over a baud time the integral of the product of a worst case delayed signal and the chirp signal goes to zero. Thus, this integral can be solved to find the minimum chip rate that yields an integral of zero. A second method is to choose values for a variety of transmission parameters and simulate the result. The values of the parameters can be modified and re-simulated until an acceptable result, including an acceptable chirp rate is found. Some examples of the transmission parameters are number or expected number of multipath signals, carrier frequency, baud rate, differential path delay and the like.

The chirp rate determiner 304 also performs any processing required, such as error correction encoding. The chirp rate determiner 304 receives other parameters, based on assigned channels from the stored library 308 such as, for example, a frequency spectrum. The chirp rate determiner 304 generates a spectrum signal for each of the at least one signal, based on the signal template parameters and the other parameters from the stored library 303 and combines the spectrum into a composite spectrum or composite signal. The composite signal is a digital signal and includes all of the input signal amplitudes. Typically, the composite signal includes the input signal amplitudes for a particular baud time common to the input signals.

It is appreciated that other techniques can be used to determine the spectrum for each of the at least one input signal. For example, the spectrum can be computed by applying the baud rate, carrier frequency, modulation, and chirp rate to an equation to compute the spectrum.

The chirp rate determiner 304 provides the composite signal to the inverse fast Fourier transform (FFT) signal converter 302. The inverse FFT signal converter, using the provided composite multichannel digital signal spectrum, converts the composite signal to a time domain digital signal stream, known as a digital chirp signal. The digital chirp signal comprises an individual digital chirp signal for each of the at least one input signals.

The chirp rate determiner 304 can also receive feedback data regarding previous signal transmissions. The feedback data can identify error prone chirp rates, carrier frequencies, baud times, and modulation types. One or more receiving stations generally provide the feedback data. Based on this feedback data, the chirp rate determiner 304 can de-allocate ineffective chirp rates, carrier frequencies, baud times, and modulation types and assign replacements for them. This feedback data can also be used to modify chirp rates to be more effective and conserve bandwidth. It is appreciated that feedback data also can be used to modify bandwidth usage for a receiver. For example, a receiver may request to reduce or increase its bandwidth allocation depending on the amount of data it has to transmit and the rate at which it needs to transmit it. The chirp rate determiner 304 can respond to this request by adjusting the chirp rate, carrier frequency, baud time, and modulation type assigned to that receiving station or by allocating additional chirp rates, carrier frequencies, baud times, and modulation types.

Figure 4:
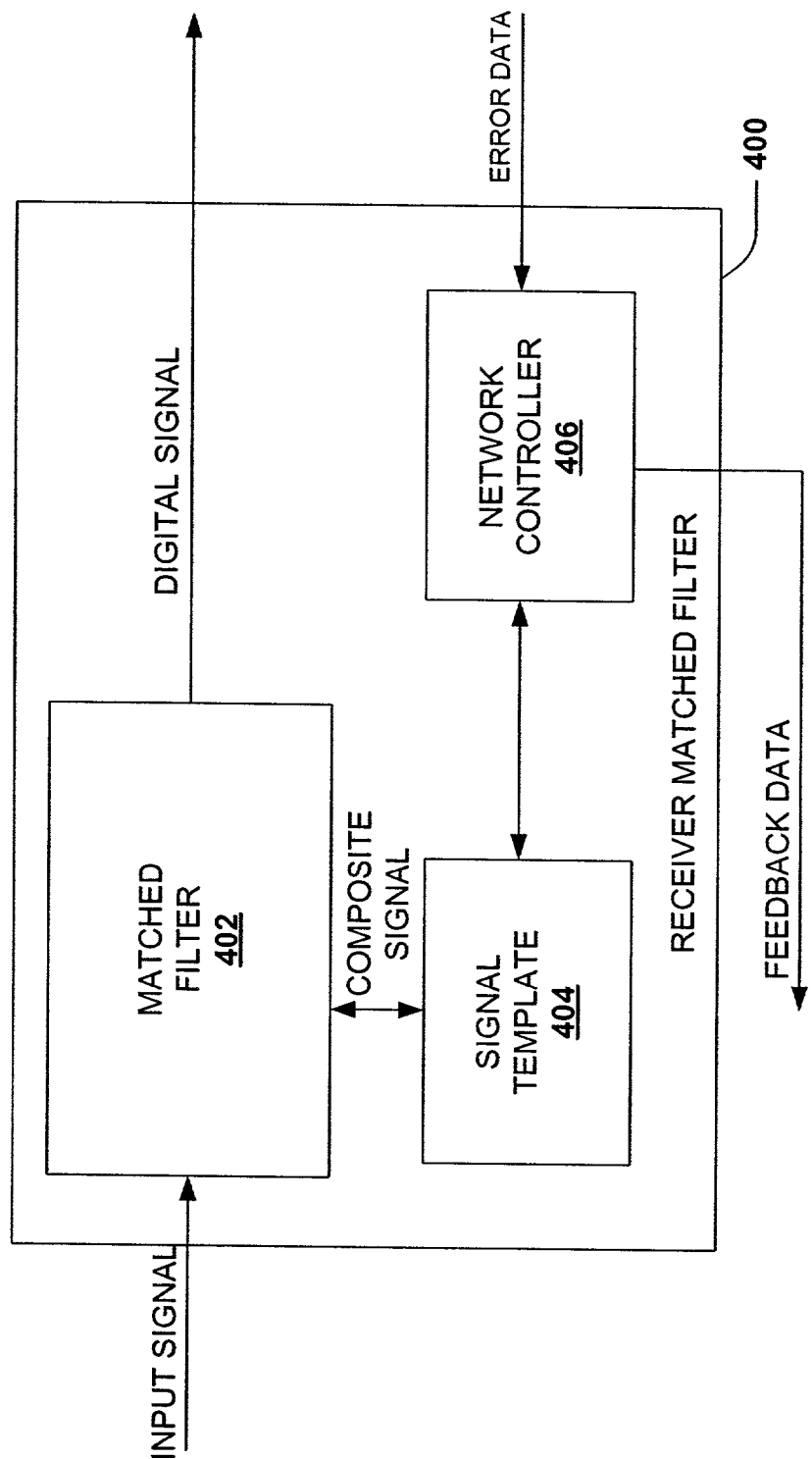
FIG. 4 is a functional block diagram of a receiver matched filter according to one aspect of the present invention.

FIG. 4 is a block diagram of a receiver matched filter 400 according to one aspect of the present invention. Generally, the receiver matched filter 400 receives an input signal containing one or more digital chirp signals. One of the one or more chirp signals is a desired chirp signal. The input signal is a digital signal. The receiver matched filter 400 removes other signals, such as noise, other signals, and/or multipath signals, to obtain the desired chirp signal to which it is matched. The receiver matched filter 400 demodulates the desired chirp signal according to a signal template to obtain an output digital signal. The signal template includes a carrier frequency, modulation, baud time and a chirp rate. The output digital signal contains data usually transmitted by a transmitter or base station. The data can be any type of data such as, but not limited to, audio, video, multimedia, program, test, network configuration, and the like type of data. The receiver matched filter 400 can be used in a communication system such as is described with respect to FIG. 2 or any other communication system using chirp rates and/or chirp signals in accordance with the present invention. Generally, the receiver matched filter 400 is for a particular receiving station. It is appreciated that multiple receiver matched filters can be used for a single receiving station according to the present invention.

A matched filter 402 receives the input signal. The input signal, as described above, includes the one or more chirp signals along with other signals. The other signals can be from noise or multipath or other chirp signals. The matched filter 402 filters or removes the other signals from the input signal to obtain the desired chirp signal. The matched filter 402 demodulates the desired chirp signal according to the signal template for the desired chirp signal to obtain the output digital signal. The signal template includes parameters of a chirp rate, a baud time, modulation type, and a carrier frequency. Furthermore, it is appreciated that the matched filter 402 is able to identify, distinguish, and demodulate the one chirp signal to which it is matched, the desired chirp signal, where a chirp signal is defined by chirp rate, carrier frequency, baud time, and modulation type.

A signal template generator 404 provides the signal template for the desired chirp signal. As stated above, the signal template can include a specified chirp rate, carrier frequency, baud time, and/or modulation type to the matched filter 402. It is appreciated that the signal template generator 404 can determine or generate signal templates for other chirp signals and can obtain data from more than one chirp signal.

It is also appreciated that the chirp signal template corresponds, generally uniquely, to the receiving station to which the corresponding transmitter chirp generator 216 belongs. The signal templates, each including chirp rate, carrier frequency, modulation, and baud rate, can be assigned to the receiving station prior to operation, received from a base station by another communication means, dynamically determined from a range of permitted chirp rates and/or other parameters, dynamically determined using coding or training signals and the like. It is appreciated that other ways of determining the correct carrier frequency, baud time, modulation, and chirp rate can be contemplated and still be within the scope of the present invention. The signal template generator 404 can also be informed of new and/or modified parameters for the signal templates by a network controller 406.

The network controller 406 receives error data regarding the chirp signal being received. The error data can indicate whether previous chirp signals are encountering large amounts of errors or transmission errors. Typically, downstream components, which perform error detection provide the error data. However, it is appreciated that other means of generating the error data can be contemplated and still be within the scope of the present invention. It is also appreciated that various types of errors, such as transmission, noise, interference and others, can be detected and generated as the error data. Further, it is appreciated that some errors are more problematic than others and that a determination may be necessary as to whether an error justifies a change in chirp rate or other transmission parameters. For large or critical errors, the network controller 406 can send feedback data, through any communication means, including a special control channel, to the base station requesting a change in the chirp signal being sent. For example, the network controller 406 may request a higher chirp rate, longer baud time, different modulation type, or a different carrier frequency. The network controller 406 also can improve bandwidth utilization by requesting reductions in the chirp rate and the like. Additionally, the network controller 406 can request changes in the chirp signal due to bandwidth usage by the receiving station. Alternate aspects of the invention can detect and control transmission errors by a variety of means, such as, coding and/or training tones received from an associated transmitter or base station.

A transceiver device that can receive and/or send chirp signals is in accordance with an aspect of the present invention. The transceiver device can have a transmitter chirp generator such as is discussed with respect to FIG. 3 and a receiver matched filter such as is discussed with respect to FIG. 4. Such a transceiver device is able to send and receive chirp signals at different chirp rates and different carrier frequencies.

Figure 5:
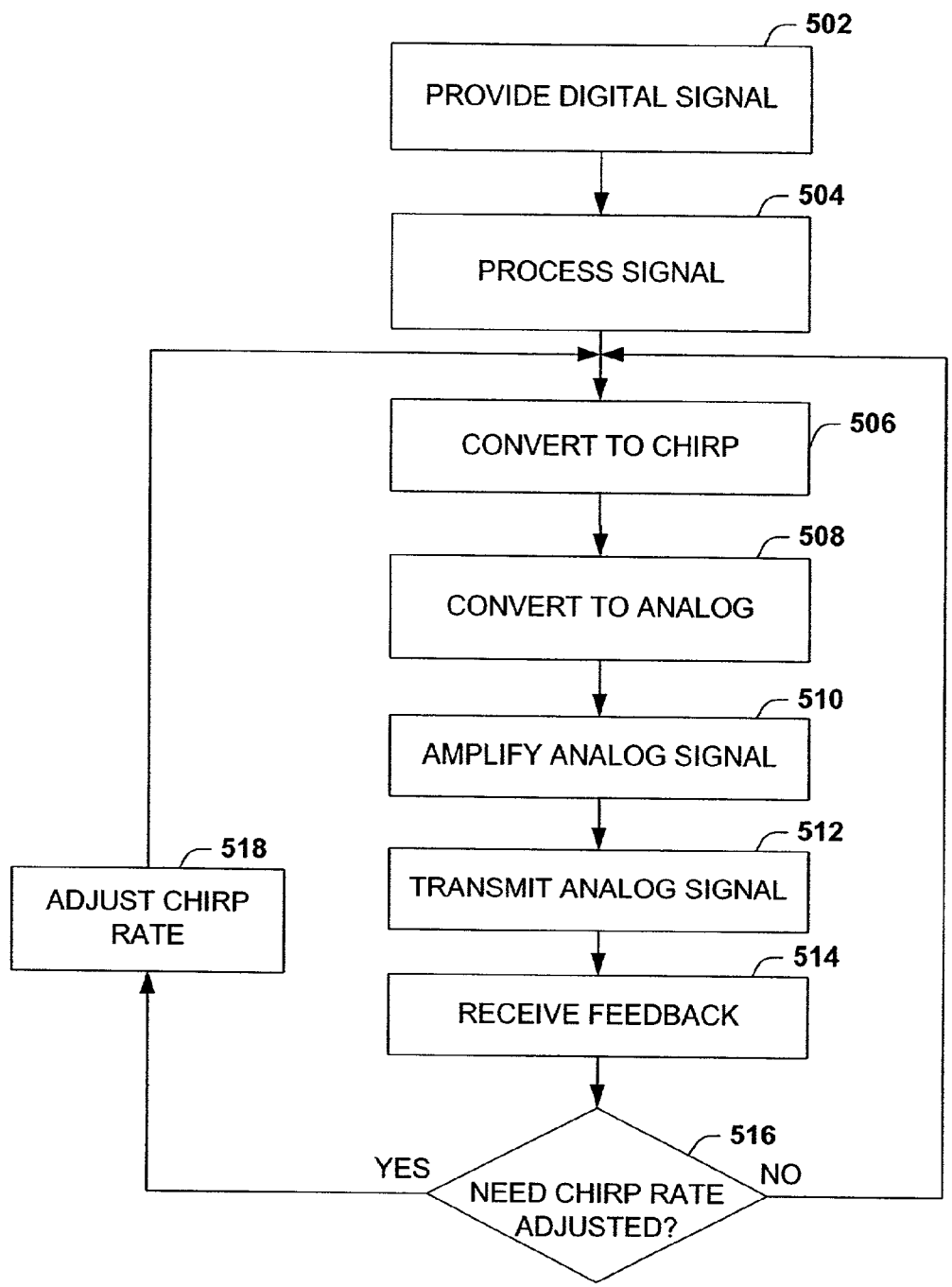
FIG. 5 is a flow diagram of a method of operating a communication system according to one aspect of the present invention.
Figure 6:
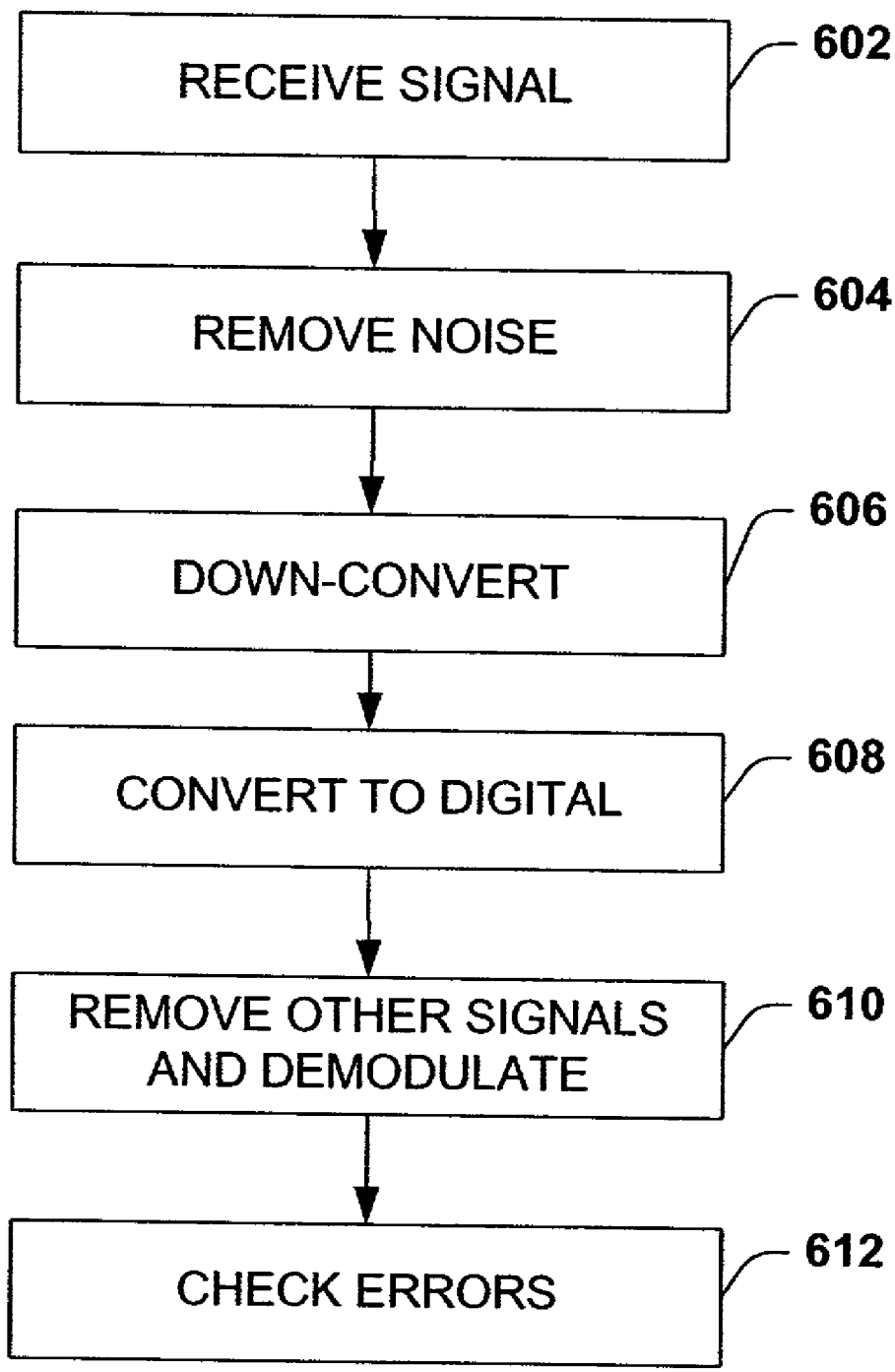
FIG. 6 is a flow diagram of a method of receiving a chirp signal according to one aspect of the present invention.
Figure 7:
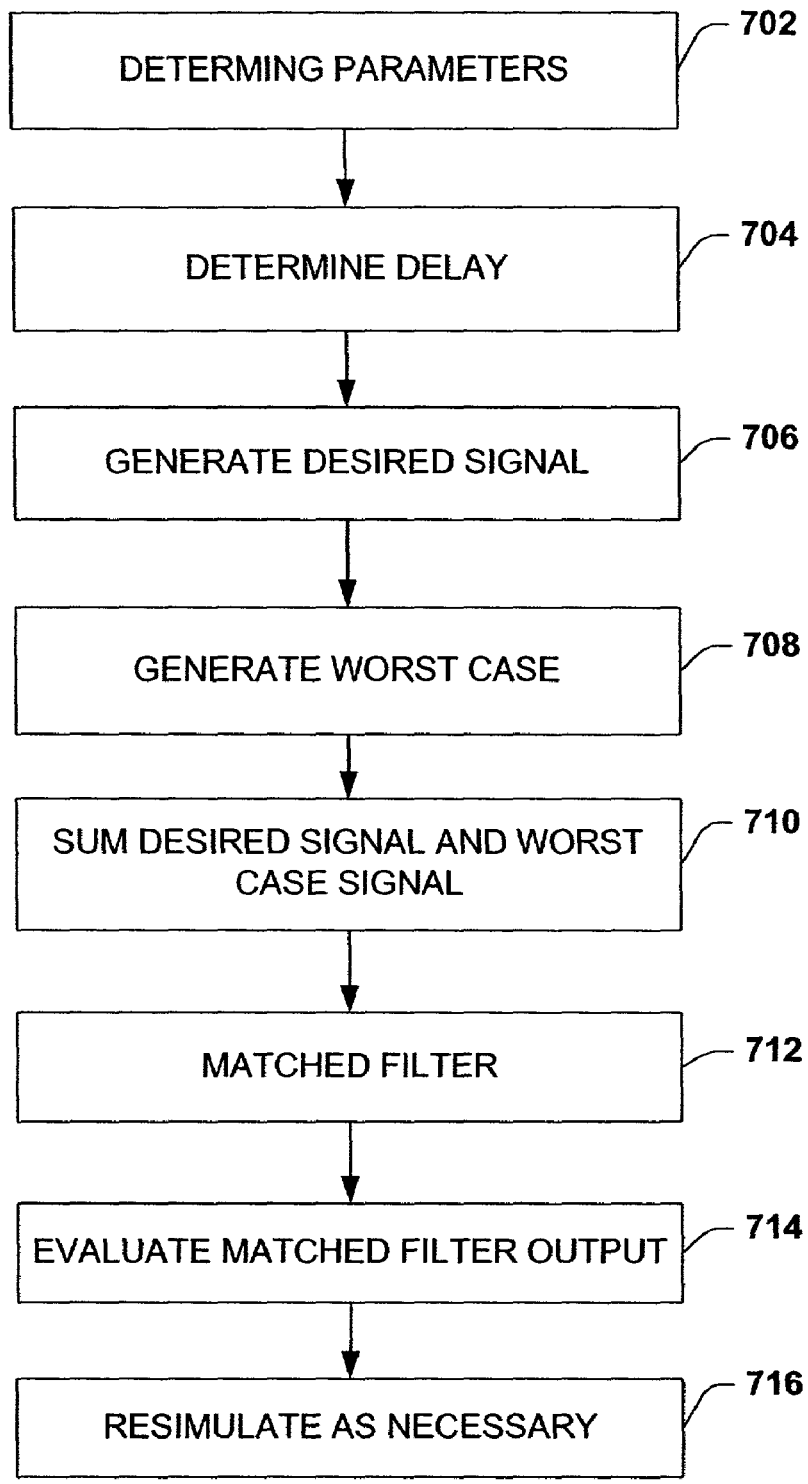
FIG. 7 is a flow diagram of a method of determining a minimum or reduced chirp rate according to one aspect of the present invention.

In view of the foregoing structural and functional features described above, a methodology in accordance with various aspects of the present invention will be better appreciated with reference to FIGS. 5–7. While, for purposes of simplicity of explanation, the methodologies of FIGS. 5–7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 is a flow diagram of a method of transmitting data according to one aspect of the invention. The communication system uses relatively narrowband chirp signals, where each chirp signal is substantially orthogonal to delayed versions of itself and to other signals being generated concurrently.

A digital signal is provided at 502. The digital signal contains data and is typically provided at a base station. The data, for example, could be voice data for a phone network, multimedia data for a multimedia broadcast or database data for a company. Signal processing is then performed on the digital signal at 504. For example, parity or error bits could be added to the digital signal. The digital signal is converted to a digital chirp signal at 506. The digital signal is converted to a chirp signal at a chirp rate, carrier frequency, modulation type if any, and baud time. It is appreciated that the simplest modulation is simply the presence or absence of the signal, the next more complicated is to phase modulate the signal with a plus or minus one, corresponding to biphase modulation. It is appreciated that these or other phase or amplitude modulations may be applied to the chirp signals in accordance with an aspect of the present invention.

The digital chirp signal is associated with transmission parameters, such as, chirp rate, baud time, differential path delay, carrier frequency, available bandwidth, modulation type and the like. These parameters can vary from implementation to implementation. However, the chirp rate is computed as a function of these parameters. Computing or determining the chirp rate requires analyzing factors such as bandwidth usage, mobility of the base and/or receiving stations, number of expected multipath signals or congestion and acceptable error rates. The chirp rate is computed so as to reduce both transmission errors and bandwidth usage. A higher chirp rate generally reduces multipath transmission errors but increases bandwidth usage. Similarly, a lower chirp rate generally increases multipath transmission errors but reduces bandwidth usage. The digital chirp signal provided at 506 is substantially orthogonal to delayed versions of itself. It is appreciated that the digital chirp signal can be a composite of individual digital chirp signals where each individual digital chirp signal is converted using a different chirp rate.

At 508, the digital chirp signal is converted to an analog chirp signal. A digital to analog converter can be used to convert the digital signal to the analog signal. The analog chirp signal is a substantially orthogonal chirp (OCHRP) signal. As with the digital chirp signal, the analog chirp signal can be a composite of individual analog chirp signals.

The chirp signal is amplified at 510. The chirp signal is amplified to reduce signal loss due to dissipation. An amplifier can be used to amplify the chirp signal. At 512, the chirp signal is transmitted. An antenna or other means can be used to transmit the chirp signal.

At 514, feedback data is received. The feedback data generally indicates and identifies transmission errors in sent chirp signals. The feedback data can also indicate bandwidth usage at one or more receivers or receiving stations. The feedback data is analyzed at 516 to determine if the chirp rate needs to be adjusted. It is appreciated that the feedback data can also be analyzed to see if other transmission parameters, such as carrier frequency and baud time, need to be adjusted. On determining that the chirp rate needs to be adjusted, the chirp rate is adjusted at 518. The chirp rate is increased if transmission errors are high and/or bandwidth usage is low. The chirp rate is lowered if transmission errors are low and/or bandwidth usage is high. It is appreciated that the low and high values are implementation dependent. It is appreciated that the exact location where the various functions such as where the corrections are calculated and implemented are according to this aspect of the present invention and may be implemented in different locations and still be in accordance with the present invention.

FIG. 6 is a flow diagram of a method of receiving data according to one aspect of the invention. An incoming signal is received at 602. A receiving antenna can be used to receive the incoming signal. The incoming signal includes a chirp signal and can include delayed versions of the chirp signal, noise, multipath interference and/or other signals. The incoming signal is an analog signal. Out of band signals, unwanted signals and noise are removed from the incoming signal at 604. Filters such as a passive filter can be used to remove the out of band unwanted signals.

The incoming signal is down-converted and anti-alias filtered at 606. The incoming signal is down-converted, frequency wise. The down-converted incoming signal is converted to a digital signal at 608. An analog to digital converter can be used to perform this conversion. The incoming signal, now digital, is processed to remove other signals, such as delayed versions of the chirp signal and demodulated according to a signal template to obtain digital data at 610. The incoming signal is filtered to determine the presence of and modulation on the chirp signal. A receiver matched filter can be used for both filtering and demodulation. The processing can be performed using a signal template with a chirp rate substantially equal to that used in initially creating the chirp signal. The signal template can also include other signal template parameters such as, but not limited to, carrier frequency, baud time and the like. All other signals in the incoming signal, except the chirp signal, are removed or filtered out and the chirp signal is demodulated at this point to obtain the digital data. Error checking is performed at 612 on the digital data to check for errors in the digital data. Various methods of error checking, such as using parity bits, can be used to check for errors in the digital data. It is appreciated that alternate aspects of the invention can also perform processing on incoming signal, the chirp signal and/or the digital data to detect and correct errors.

According to an alternate aspect of the invention, feedback data can be generated based on transmission errors and bandwidth usage. The feedback data includes an indication of transmission errors and bandwidth usage. The transmission errors can be obtained by error detection means and/or by measuring the amplitude of the signal out of the matched filter. For some modulations, such as bi-phase modulation, if the matched filter output amplitude falls in a no-decision region, an error may be indicated. Bandwidth usage can be obtained from a network controller or other component. The feedback data is generally sent to a base station to adjust the chirp rate, baud time, modulation, and carrier frequency, to compensate for the feedback data.

It is appreciated that the methods described in FIGS. 5 and 6 can be combined to operate a communication system according to the present invention. It is appreciated that alternate aspects of the invention can also perform processing on the signal to detect and correct errors and modify the network parameters.

FIG. 7 is a flow diagram of a method of determining a minimum or reduced chirp rate according to one aspect of the present invention. As discussed above, the chirp rate is chosen such that during multipath interference, a sufficient change in frequency occurs to provide the needed substantial orthogonality between a chirp signal and delayed versions of the chirp signal. The method begins with determining acceptable transmission parameters 702. The transmission parameters include carrier frequency, differential path delay, available bandwidth, baud time and the like. The determination of the transmission parameters is based on the implementation of a communication system and includes factors such as signal density, distance, mobility, expected number of interferers, desired data rates, and the like.

Next, at 704 a minimum differential path delay is determined based on prior experience or information obtained from the training signals. Previous simulations and implementations can be reviewed to assist in determining the differential path delay rate estimate. It is appreciated that results of previous simulations and implementations can be stored in a storage device or memory device in order to be referenced for minimum path delay estimation. The differential path delay can be thought of as the minimum delay required from the desired non interfered signal, referred to as line of sight (LOS), and delayed versions of the signal that the chirp rate can provide substantial orthogonality for. Visually, the differential path delay would form an ellipsoid around the destination point for a LOS signal in which the destination point and origination point define the foci of the ellipsoid. In some cases, due to an additive multipath reflection, the minimum differential path delay will be those signals either arriving earlier or arriving later than the desired possibly non-LOS signal and can be either positive or negative. In this case, those signals whose differential path delay magnitude is greater than the minimum differential path delay for this baud time, chirp rate, and modulation will be orthogonal to the desired signal.

Once the minimum differential path delay and the available bandwidth are available, the chirp rate for the desired signal is calculated at 706. Previous simulations and implementations can be reviewed to assist in determining the chirp rate estimate. It is appreciated that results of previous simulations and implementations can be stored in a storage device or memory device in order to be referenced for chirp rate estimation.

At 706, a line of sight signal or desired signal is generated according to the transmission parameters and the differential path delay. A worst case, delayed signal is generated or derived at 708 from the line of sight signal by shifting in time the line of sight signal so that the portion of the delayed signal from the previous baud time which overlaps the desired signal and the portion of the delayed signal which overlaps the desired signal are both set to the worst case phase as determined by simulation. Worst case is defined as that which produces the least voltage out of the matched filter. The phase shift caused by a reflector can be anything, therefore the multipath phase at the differential path delay is stepped over 8 phase positions corresponding to 45-degree increments approximately defining a circle. The same is done for the multipath phase at time zero. Thus, there are 64 possible permutations of phase. By defining worst case as the minimum matched filter output, it is possible to determine which differential path delay, baud rate, and chirp rate will provide worst case performance at the selected carrier frequency, chirp rate, and differential path delay. It is appreciated that under a different aspect of this invention the worst case signals may be determined by other means.

At 710 the worst case multipath signal and the desired signal are summed to generate a received signal, which is input to the matched filter. The matched filter 712 output is an indication of the ability of the chirp rate to remove or reduce multipath interference. According to one aspect of the invention, the matched filter output varies from 0 to 0.5 volts, where the closer the matched filter output is to 0.5, the better the chirp rate and signal are at removing or reducing multipath interference. The matched filter output is provided at 714, which is tested to see if it is acceptable. On the matched filter output or spectral width not being acceptable, the transmission parameters and/or chirp rate are adjusted and re-simulated 716 until the matched filter output is acceptable. It is appreciated that an acceptable value for matched filter output can vary depending on a variety of factors, as described herein. Further, it is appreciated that other parameters and indicators and/or ranges of values may be used to determine the suitability of a particular chirp rate. As an alternative approach a history table of minimum differential path delays for particular carrier frequencies, baud times, modulations, and acceptable bandwidths can be stored in memory. In this case the chirp rate can be read from memory instead of having to rerun the simulation provided the environment described by the table has not changed significantly since the table was generated.

Figure 8:
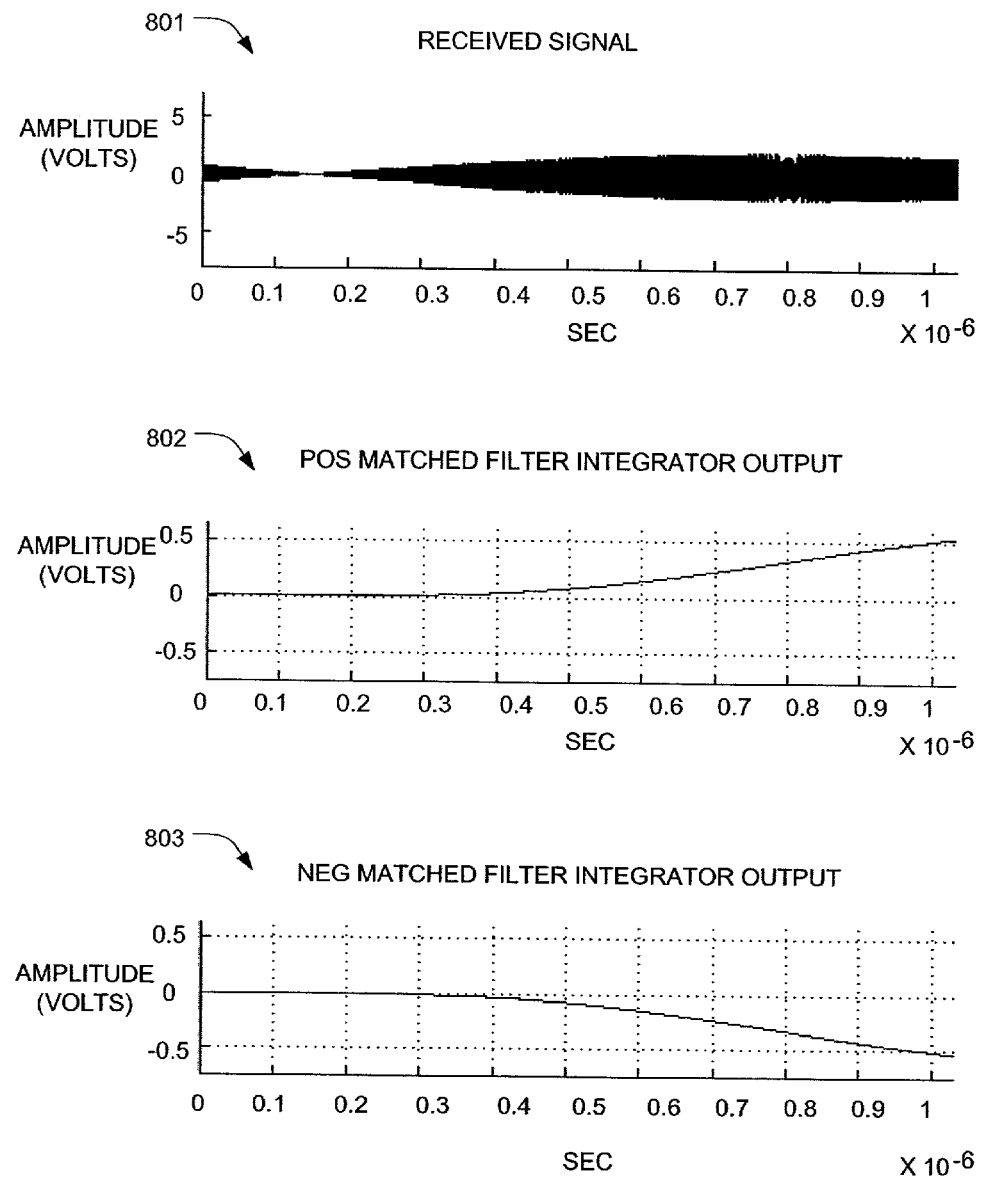
FIG. 8 shows a simulation of a wideband chirp signal according to one aspect of the present invention.

FIG. 8 illustrates graphs of signal amplitudes over time that can be used in a method of determining a wideband chirp rate using simulations according to one aspect of the invention. The wideband chirp rate is determined by simulation of transmission parameters. This simulation is based on, for example, one worst case multipath signal or delayed signal interfering with a desired signal and both are assumed to be of the same amplitude. Generally, the multipath signal will be attenuated by the reflection that generated it, so these are indeed worst case assumptions. A linear wideband chirp rate is assumed.

The transmission parameters are chosen for this simulation. The significant transmission parameters include carrier frequency and baud rate. The carrier frequency of this simulation is 1 GHz. The baud rate is 1 MS/S. The number of samples (NS) is equal to 8,192 and the sample frequency is 7.8 MS/S so that there is one baud in NS samples. A worst case multipath delay is assumed of one half of a carrier cycle, which approximates the worst case where the desired signal is 180 degrees out of phase with the delayed multipath signal.

In order for the delayed signal to not interfere with the desired signal, the desired signal needs to be orthogonal to delayed versions of itself. This requires that the integral of the product of the desired signal and the delayed signal over the baud time goes to zero. Thus, over the time of measurement, their frequencies should be such that one traverses at least one rotation more than the other. Another way to say this is that one signal's cumulative phase at the end of the baud time should be an integral number of rotations more than the other, 1, 2, 3, . . .

FIG. 8 illustrates a plot of a received signal 801 generated as the sum of the desired signal and the worst case multipath signal which is just the desired signal delayed by one half of a carrier frequency period. Multiplying the received signal by the desired signal and integrating the product over the baud time implement a positive matched filter output 802. Since the delayed signal was chosen as a worst case signal, it is likely that actual multipath signal interference will be less destructive. Furthermore, the delayed signal, as simulated, has the same amplitude as the desired signal. However, in reality, the delayed signal would generally have a lower amplitude than the desired signal.

Orthogonality is shown in FIG. 8 which shows the received signal 801 before it is input to the matched filter. Also, FIG. 8 shows a positive matched filter output 802 computed by multiplying the received signal by a positive replica of the desired signal and a negative matched filter output 803 computed by multiplying the received signal by a negative replica of the desired signal. Thus, simple biphase data can be carried by the wideband chirp signal. The magnitude of the amplitude of the matched filter output signals (802 and 803) are roughly 0.5 out of the matched filter integrators, which is the average value of a square of a sine wave of amplitude 1.0. This amplitude of the matched filter output signals (802 and 803) is referred to as the matched filter output. Orthogonality of the desired signal to its delayed signal is shown by the received signal envelope which starts small, decreases and then gradually increases as the single phase rotation occurs over the baud time.

Figure 9:
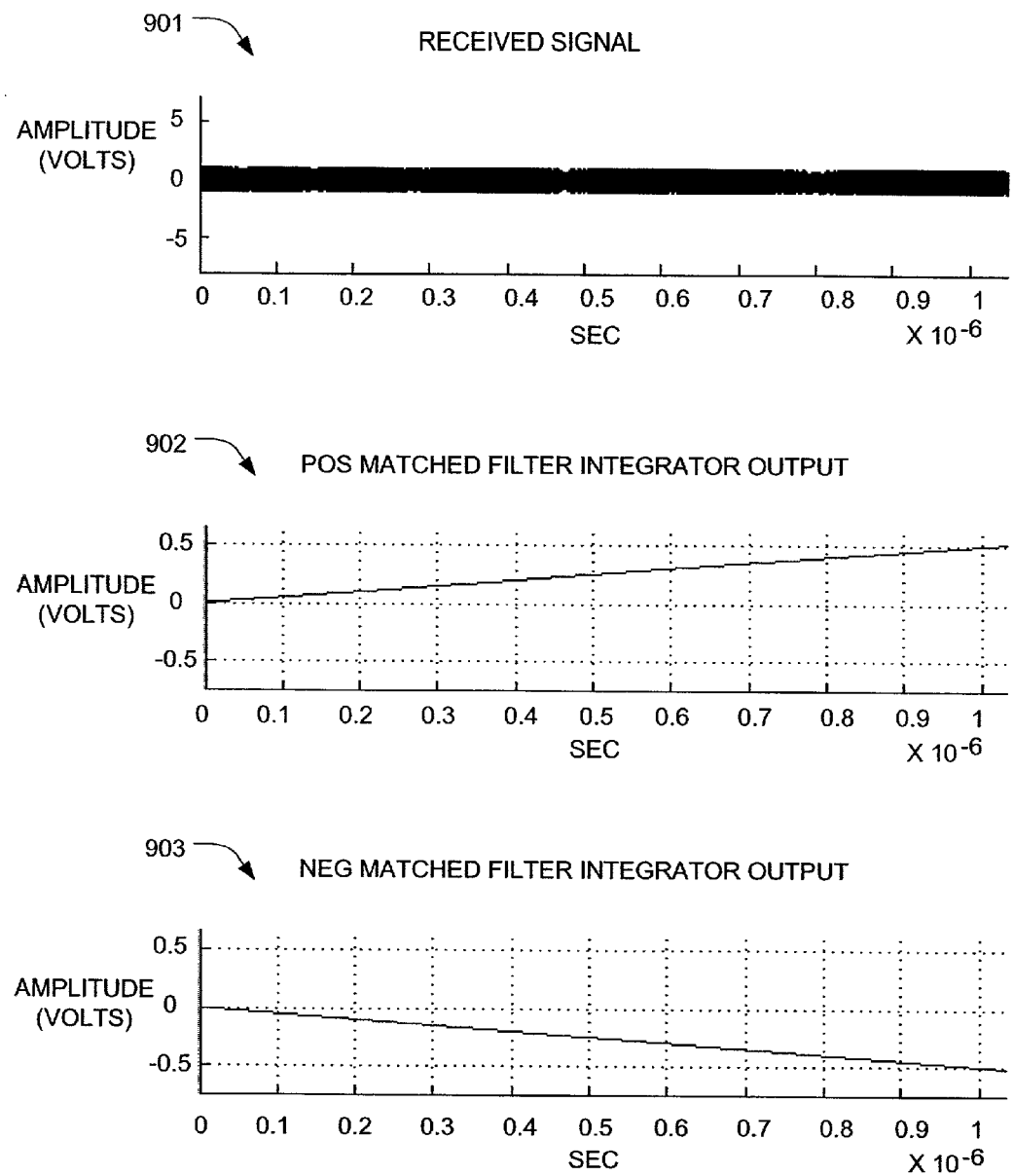
FIG. 9 shows a simulation of a desired wideband chirp signal without a delayed signal according to one aspect of the present invention.

FIG. 9 shows a simulation of the desired signal without the delayed multipath signal. The received signal 901 shows a constant amplitude as expected. The positive matched filter output 902 and the negative matched filter output 903 show a matched filter output of 0.5, as expected. The fact that the simulation results for the signal out of the matched filter agree with theory (average value of the product of two identical unity amplitude sine waves is 0.5) was used to check the accuracy of the simulation.

Next the spectral width of a linear chirp signal with high enough chirp rate to be orthogonal to a delayed signal is investigate, where the delay is one half of a carrier cycle. This corresponds to the worst case multipath delay. To compensate for the worst possible multipath delay, the chirp rate is chosen such that during the small delay caused by the multipath a sufficient change in frequency occurs to provide the needed orthogonality, as stated above. The worst-case multipath delay is approximately the carrier period TC divided by 2, corresponding to destructive interference of a non-chirped carrier at frequency, FC.

The frequency change during this delay will be:

$$\Delta FC = CR(\text{Hz/sec}) * TC(\text{sec})/2 \qquad \text{Eq. 1}$$

where CR is the chirp rate and TC is the carrier period.

To have orthogonality this frequency change will result in a net phase slip over the baud time (TB) of $2\pi$ radians or 1 revolution. Since each sample of the multipath signal is delayed by the same time this phase slip will be uniform over the baud.

$$1 \text{ revolution} = TB*\Delta FC = TB*CR*TC/2 \qquad \text{Eq. 2}$$

Solving Eq. 2 for CR yields:

$$\begin{aligned} CR &= 2/(TB*TC) \\ &= 2/(0.167E-06*1E-09) \\ &= 1.19E-15 \end{aligned} \qquad \text{Eq. 3}$$

Thus, with a carrier frequency of 1 GHz, the frequency F will have shifted in 0.167 μs:

$$\begin{aligned} \Delta F &= CR*0.167E-06 \\ &= 1.19E+15(\text{Hz/sec})*0.167E-06 \\ &= 2.0E+09 \text{Hz.}(2\text{GHz}) \end{aligned} \qquad \text{Eq. 4}$$

Figure 10:
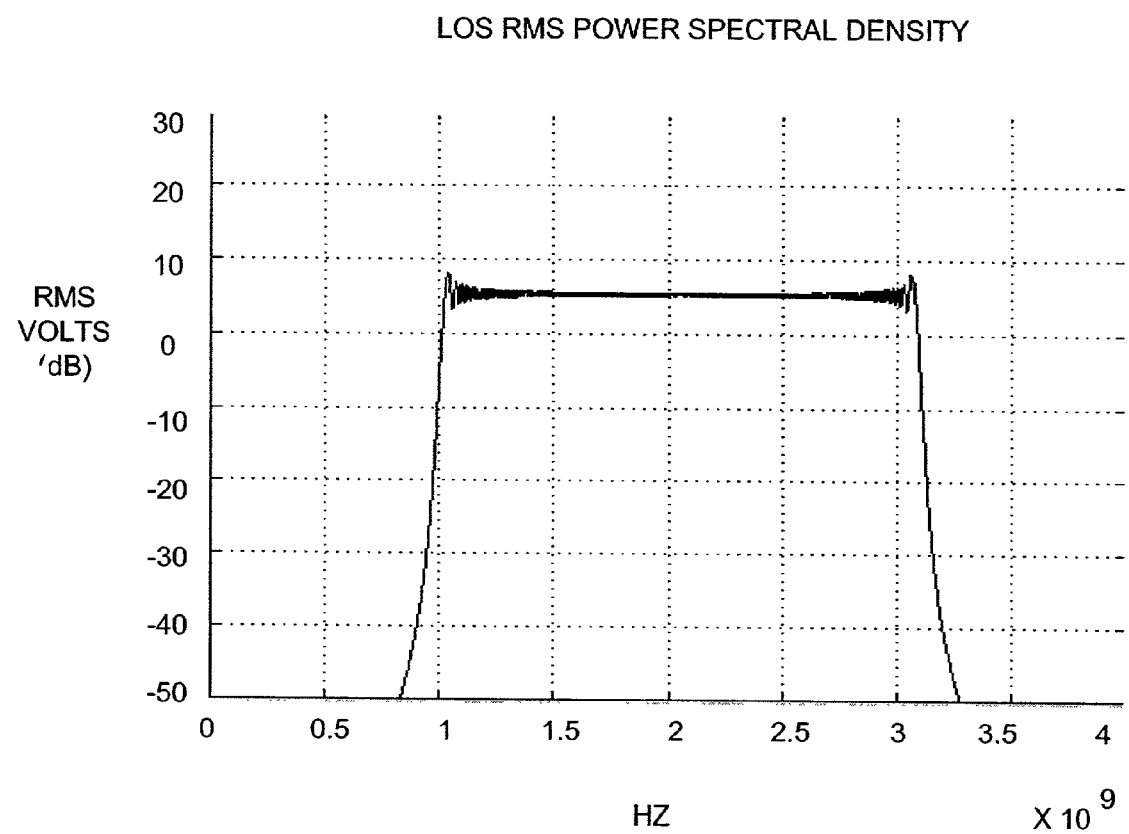
FIG. 10 shows a resulting signal frequency spectrum for the desired wideband chirp signal of FIG. 9 according to one aspect of the present invention.
Figure 11:
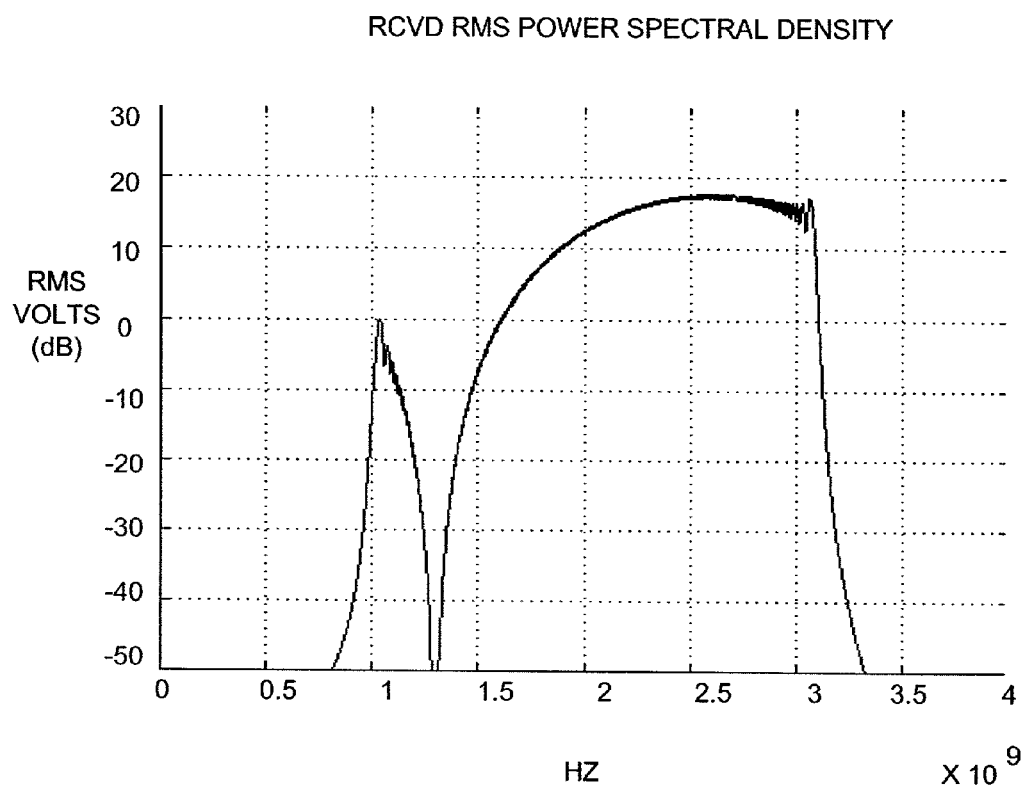
FIG. 11 shows a resulting received signal frequency spectrum for the desired wideband chirp signal of FIG. 9 that includes multipath interference according to one aspect of the present invention.

FIG. 10 shows a power spectral density of the received waveform from the simulation of FIG. 9, where there is no multipath interference or delayed signal. As expected, the chirp waveform covers a spectrum from about 1 to 3 GHz. FIG. 11 shows the resulting power spectral density of the received waveform from the simulation of FIG. 8, which includes interference from the delayed signal. It can be seen that the resulting received waveform is significantly affected by the delayed signal. Thus, a 1 GHz carrier frequency undergoes a 2 GHz shift up to 3 GHz, which is a large amount of bandwidth to use.

A possible downside of the wideband chirp signal is that in order to assure the necessary frequency shift within the worst case delay time of a destructive multipath signal, the chirp rate has to be relatively large, but once the reflection has occurred, the instantaneous signal frequency keeps on shifting using a large bandwidth by the end of the baud time. So, wideband chirp modulation can be used to suppress multipath signals, but must be very wideband. Thus, wideband chirp rates can be used to overcome multipath interference, but at a cost of high bandwidth usage.

Figure 12:
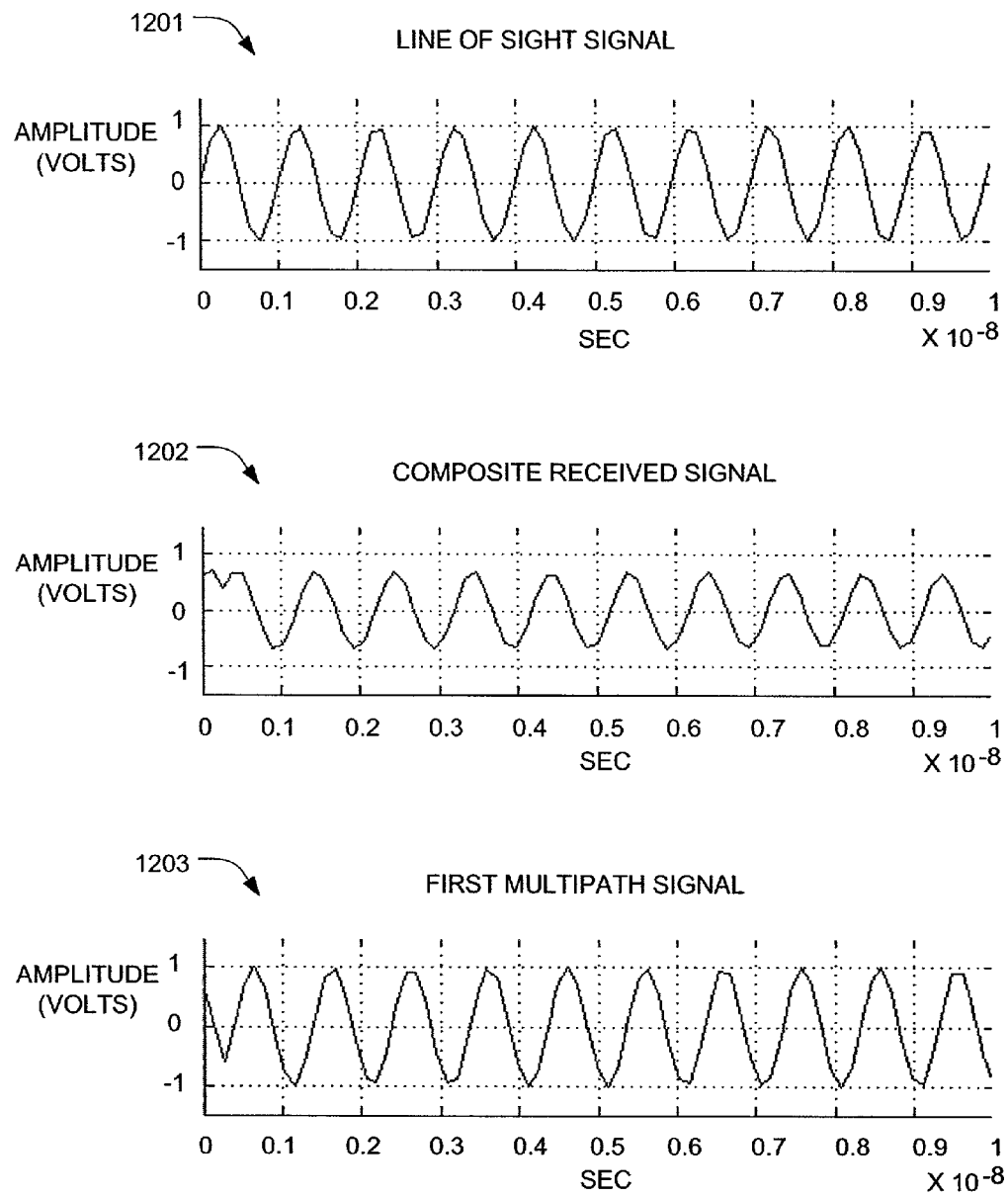
FIG. 12 shows several cycles of a desired signal according to one aspect of the present invention.

FIG. 12 shows the first few cycles of a desired (LOS) signal 1201, a delayed signal 1203 and a composite received signal 1202, such as from the simulation of FIG. 8. Initially, at the start of the baud interval, the received signal 1202 is changing frequency very slowly in terms of phase or frequency shift per cycle. However, the amount of phase shift is such that by the end on the baud time, a full rotation has occurred. The delayed signal 1203 is not exactly 180 degrees out of phase with the desired signal 1201 at the start, but gradually becomes so over the course of the baud time. This can be ascertained by observing the envelope of the received signal 1202.

Figure 13:
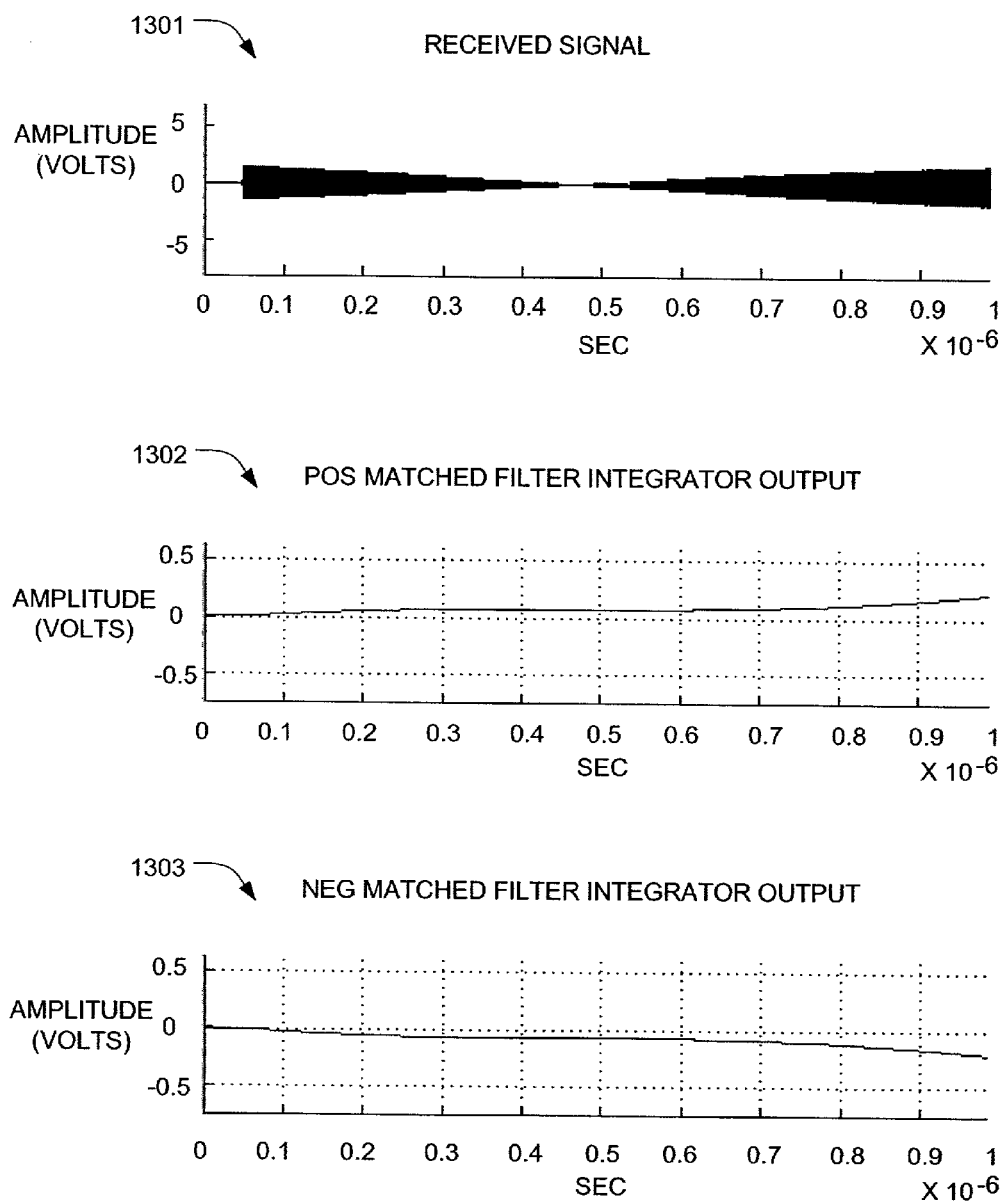
FIG. 13 shows a simulation of part of a chirp signal receiver according to one aspect of the present invention.

FIG. 13 illustrates a method of determining narrow band chirp rates using simulations according to one aspect of the invention. The chirp rate is a narrowband chirp rate and uses substantially less frequency bandwidth than the wideband chirp rate of FIGS. 8–12 (see above) to transmit the same amount of data. The chirp rate is determined by simulating a signal according to a set of transmission parameters. This simulation is based on a worst case multipath signal or delayed signal interfering with a desired signal. A linear chirp rate is assumed.

It is noted that the wideband chirp rate has to be very high in order to assure the necessary frequency shift within the worst-case delayed signal. Once the reflection has occurred, the signal frequency will continue shifting and span a large bandwidth by the end of the baud time. A narrowband chirp rate is one which, like wideband chirp rates, can be used to generate a chirp signal having the chirp rate so as to substantially orthogonal to delayed versions of itself, but is relatively narrowband.

A variety of modulation techniques, such as on off keying (OOK), pulse width modulation and single sideband modulation (SSB) can be used to cause delayed versions of a desired signal to be orthogonal to itself. However, any signal fully orthogonal to all delayed versions of itself will inherently be wideband.

But, real world implementations usually do not encounter worst case conditions. For example, it is almost impossible for a delayed signal to be 180 degrees out of phase with a desired signal. Further, there is usually more attenuation in delayed signals so that a delayed signal would not totally cancel out a desired signal.

Thus, a narrowband chirp rate that does not necessarily cover all worst case conditions can be used according to one aspect of the present invention. Narrow band spectral utilization is accomplished by making the differential path delay longer than the worst case differential path delay of TC/2, but still small enough to result in a chirp signal which is orthogonal to most delayed multipath signals. The narrowband chirp rate can be selected such that transmission errors are reduced compared to a conventional OFDM system while operating at a relatively narrow frequency range. If the differential path delay (time of arrival difference between the multipath signal and the desired signal) is much greater than half of a carrier period, the rate of change of a chirp carrier frequency can be greatly reduced. The tradeoff, then, is between carrier frequency, bandwidth, chirp rate, the baud or symbol rate, and the differential path delay. Therefore, transmission parameters including chirp rate and the like, can be selected, in accordance with an aspect of the present invention, to improve performance possible for a particular differential path delay for a range of available carrier frequencies.

By way of illustration, to make the signal path easy to visualize, assume a line of sight (LOS) signal or desired signal and plot the locus of all points at a particular distance from the ends of the path, e.g., the transmitter and receiver antennas. The locus of points forms an ellipse in which the origination and destination of the LOS signal define the foci. All multipath signals which start out at the transmitter end of the path and have the same differential path delay will fall somewhere on the same ellipse. For a typical Multichannel Multipoint Distribution System (MMDS), the maximum range is about 30 miles or about 51 KM. The carrier frequency is from 2.5 GHz to 2.65 GHz so the maximum wavelength is equal to $3 \times 10^8$ divided by $2.5 \times 10^9$ or about 0.12 meters.

Thus, a plot of the locus of points that could produce a differential path delay of one half wavelength for the 51 Kilometer path would have an elliptical surface that is defined by all differential path delays 0.06 meters longer than the desired signal. This ellipsoid would appear as a long and narrow ellipsoid. Next, if we plotted the locus of all points that can contribute a 1½ wavelength differential path delay, we will get a slightly fatter ellipsoid. In effect, there is a family of ellipsoids corresponding to differential path delays of ½; 1 and ½, 2 and ½, 3 and ½, and so on up to N and ½ wavelengths, where N is a large positive integer. These ellipsoids can produce destructive interference for a sine wave at this frequency, depending on the reflected phase. Even for differential path delays of 100 or 150 meters, this is a very long and very narrow ellipsoid.

The technique for designing an OCHRP signal, according to an aspect of the present invention, is to choose the chirp rate to make the differential path delays caused by those interference ellipsoids with destructive reflected phase substantially orthogonal to the desired signal. In effect, the OCHRP signal is chosen so that as many as possible of the interference ellipsoids are transparent to it while keeping within the allowable bandwidth.

The performance of an orthogonal chirp system will generally be superior to that of an OFDM system, under equivalent conditions, assuming random distribution of multipath reflectors and both having a dynamic network controller. This can be explained as follows: Since all of the interference ellipsoids can cause destructive interference for OFDM, and since the OCHRP signal is designed such that only a relatively small number of the interference ellipsoids can cause destructive interference to the OCHRP signal the OCHRP signals performance will be superior to that of the OFDM under equivalent conditions.

As stated above, it is possible to perform integration to find a solution for matched filter output for various multipath signals. However, the solution is quite complex. A simulation of selected transmission parameters, such as carrier frequency, baud rate, available bandwidth, and differential path delay, facilitates determination of a chirp rate. If the results of the simulation are acceptable, those parameters can be used to derive an acceptable chirp rate. If the results are not acceptable, the parameters can be modified accordingly.

After a point in time corresponding to the differential path delay, the multipath signal or delayed signal is the desired signal delayed by the differential path delay. In order to be pessimistic, the multipath from time zero to the differential path delay time is assumed to be the delayed signal from the previous baud. The phase shift caused by a reflector can be anything, therefore the multipath phase at the differential path delay is stepped over 8 phase positions corresponding to 45-degree increments approximately defining a circle. The same is done for the multipath phase at time zero. Thus, there are 64 possible permutations of phase. By defining worst case as the minimum matched filter output, it is possible to determine which differential path delay, baud rate, and chirp rate will provide worst case performance at the carrier frequency selected given the differential path delay. As seen above, the matched filter output for no interference is 0.5 volts, which is just the average value of a sine wave squared. So for this case, a matched filter output of greater than 0.35 is estimated to be quite safe. It is appreciated that other simulations can be performed according to the present invention using different and/or other parameters to determine whether chosen transmission parameters are acceptable. For example, more phase steps and range effects can be performed to provide a better simulation.

FIG. 13 shows a simulation of a chirp signal according to one aspect of the invention. The chirp signal is simulated with a 2.5 GHz carrier frequency, a 1 MHz baud rate, a chirp rate of 6 times the baud rate divided by the baud time which yields 6 MHz of frequency shift in one baud time, and a differential path delay of 15 meters. FIG. 13 shows the received signal 1301, the positive matched filter output 1302 and the negative matched filter output 1303. The simulation yields a matched filter output of about 0.25, which may be too low.

A wave will propagate 15 meters in $15/3 \times 10^8$ seconds or about 0.05 μs which is what can be seen in FIG. 13. It is appreciated that the worst case matched filter output does not occur for phase cancellation at the start of the arrival of the delayed signal, but more near the middle of the baud time as indicated by the received signal 1301 envelope amplitudes.

Figure 14:
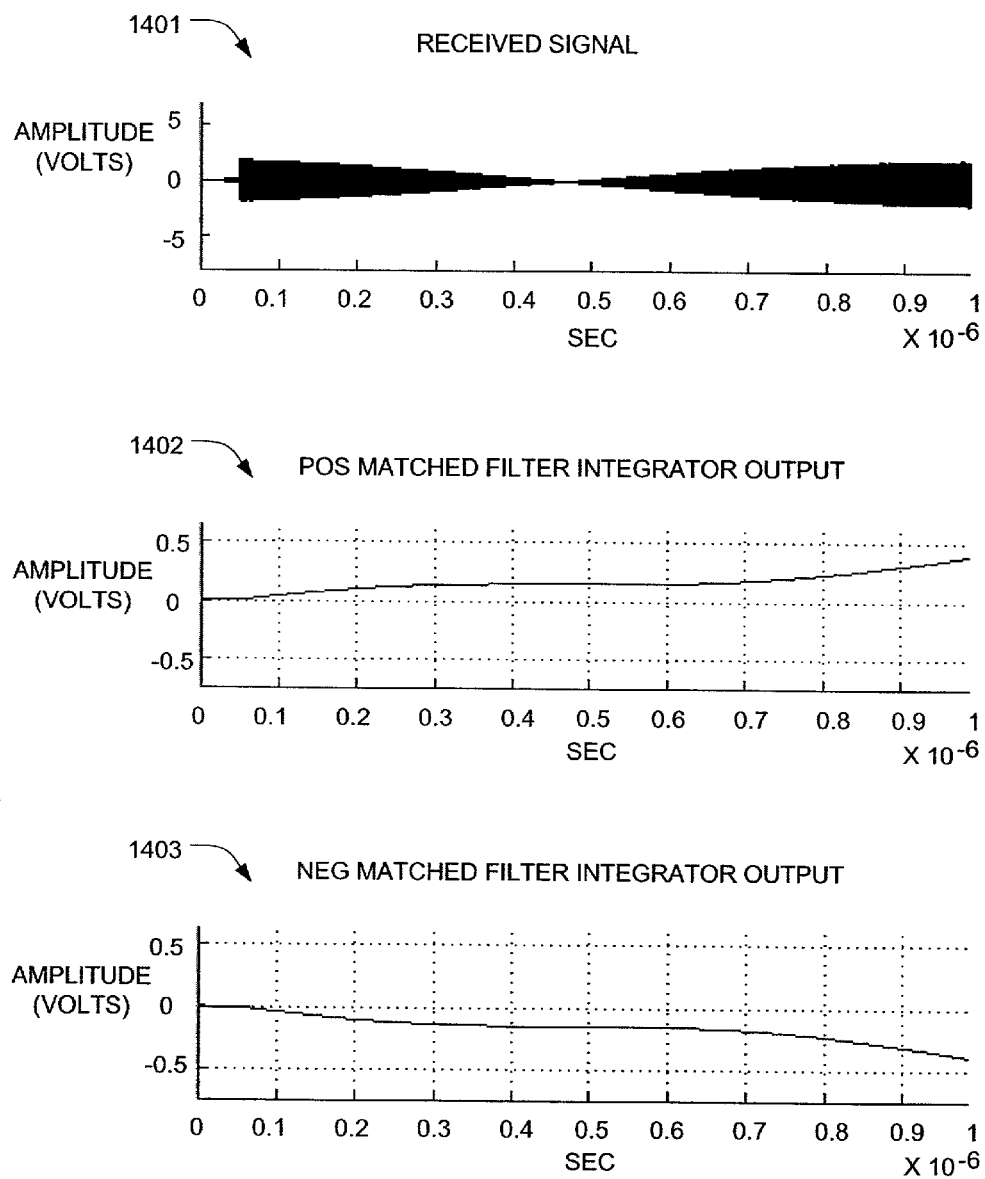
FIG. 14 shows another simulation of part of a chirp signal receiver according to one aspect of the present invention.

FIG. 14 shows a simulation of a chirp signal according to one aspect of the invention. The chirp signal is simulated with a 1 MHz baud rate and the chirp rate has been increased to 9 MHz in one baud time and a differential path delay of 15 meters as in FIG. 13. FIG. 14 shows a received signal 1401, a positive matched filter output 1402 and a negative matched filter output 1403. The simulation yields a matched filter output of 0.415, which is acceptable. Thus, by comparing FIG. 14 and FIG. 13, it can be seen that the higher chirp rate of FIG. 14 yields a better matched filter output. So in this case, chirp rate and thus bandwidth was increased to obtain adequate performance.

Figure 15:
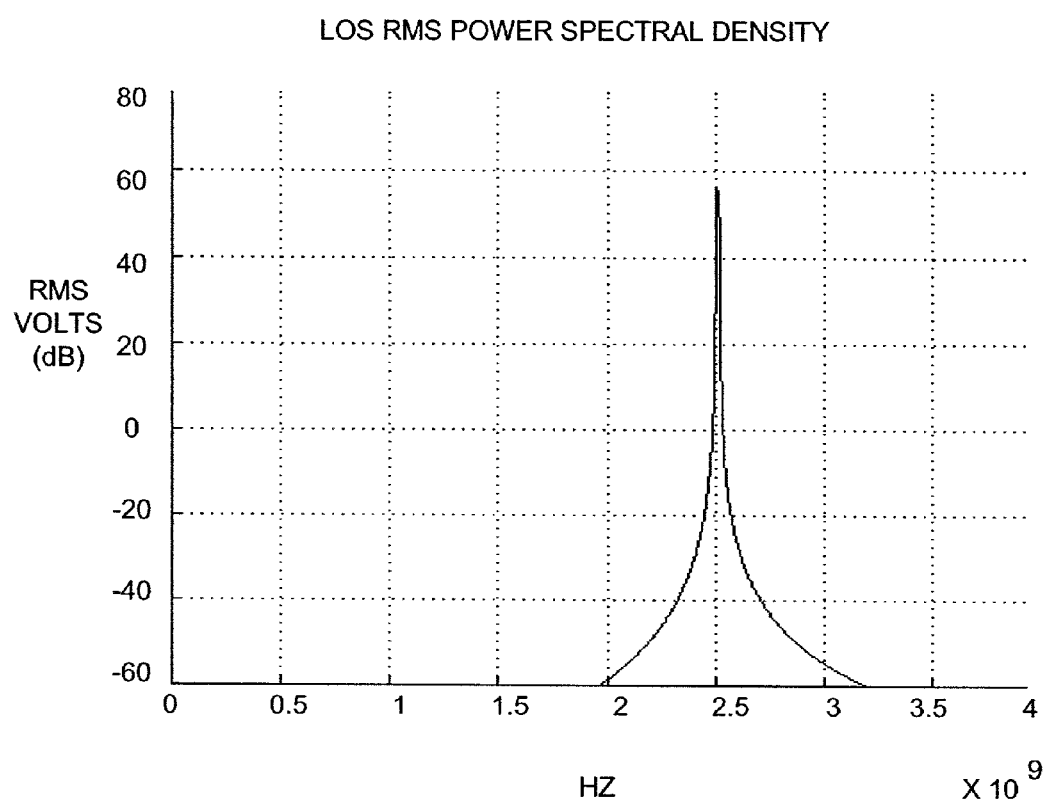
FIG. 15 shows a frequency spectrum of a chirp signal according to one aspect of the present invention.
Figure 16:
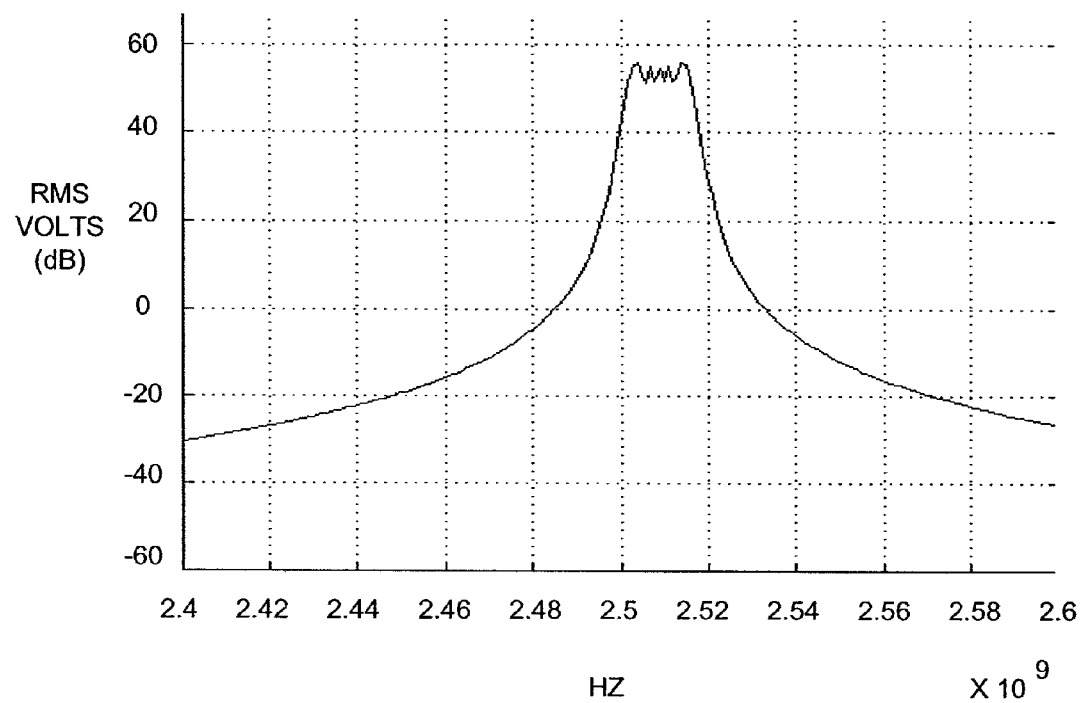
FIG. 16 shows a 3 dB bandwidth of a chirp signal according to one aspect of the present invention.

FIG. 15 shows the spectrum of the chirp signal of FIG. 14. The spectrum is shown to be at about 2.5 GHz. FIG. 16 shows the zoomed in view of the spectrum of FIG. 15. FIG. 16 shows that the 3 dB bandwidth is about 13 MHz, which approximates the bandwidth used.

Figure 17:
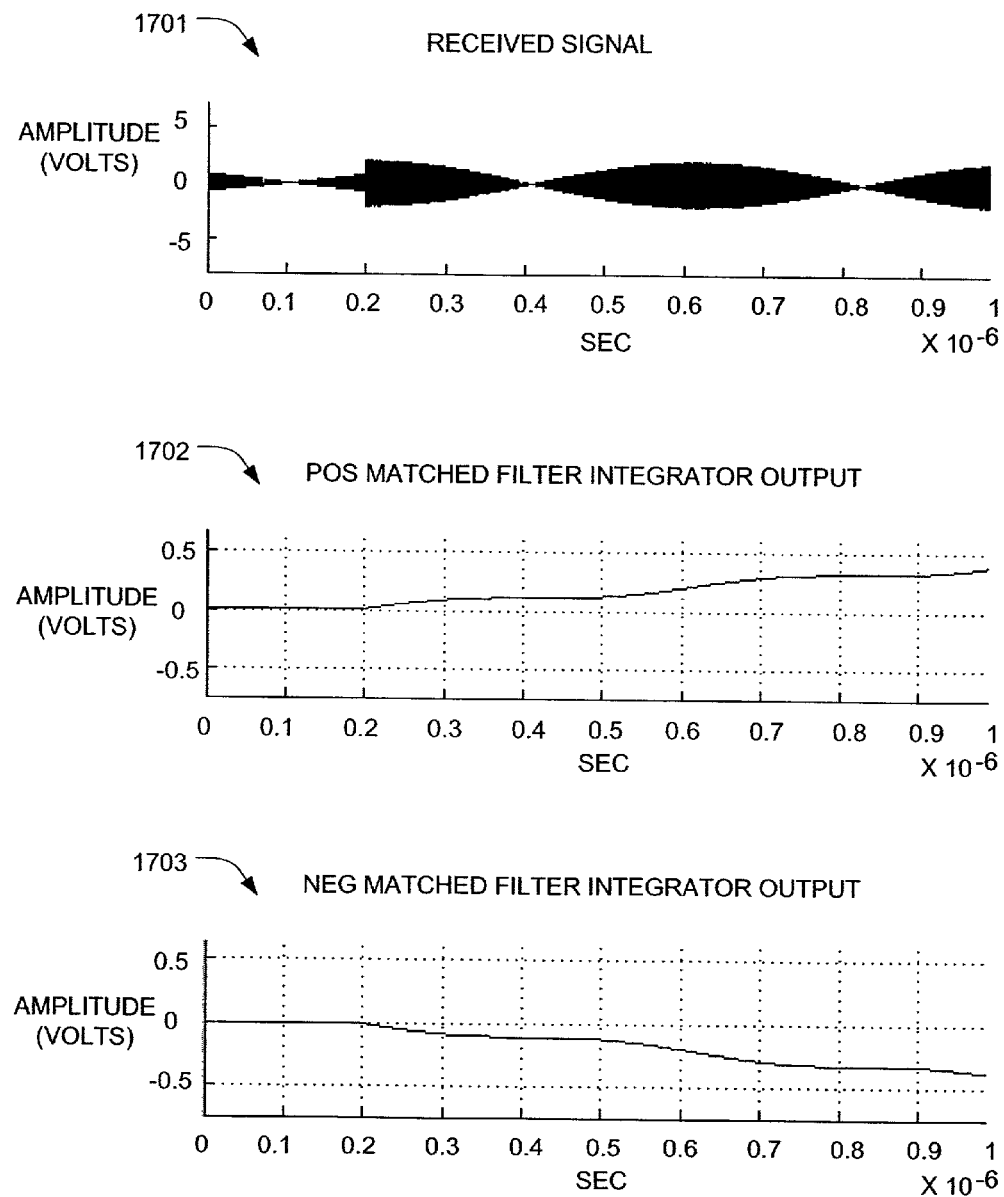
FIG. 17 shows a simulation of part of another chirp signal receiver according to one aspect of the present invention.
Figure 18:
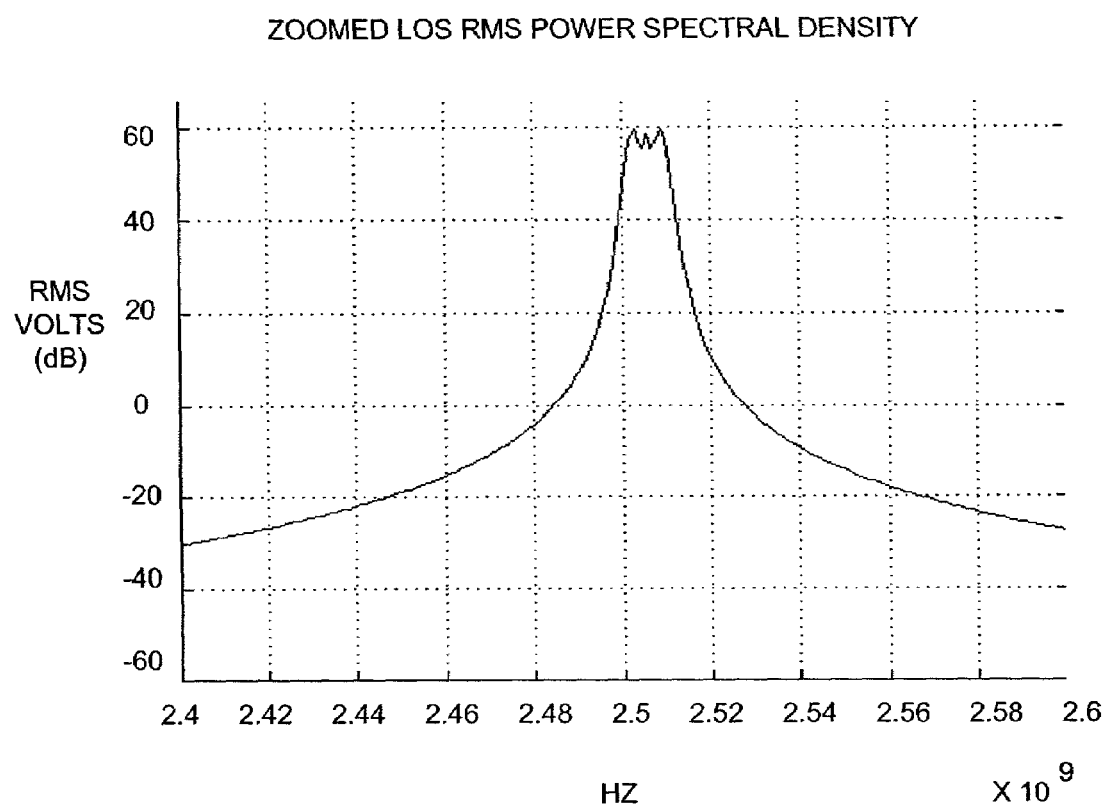
FIG. 18 shows a 3 dB bandwidth of another chirp signal according to one aspect of the present invention.

FIG. 17 shows a simulation of a chirp signal according to one aspect of the invention and is similar to that shown in FIG. 13. The chirp signal is simulated with a 1 MHz baud rate, chirp rate of 6 MHz in one baud time, and a differential path delay of 60 meters. The difference between this chirp signal and the chirp signal of FIG. 13 is that the differential path delay has been increased to 60 meters for this chirp signal as opposed to 15 meters for the chirp signal of FIG. 13. FIG. 17 shows the received signal 1701, the positive matched filter output 1702 and the negative matched filter output 1703. The simulation yields a matched filter output of about 0.3934, which is likely to be acceptable and is much better than that of the simulation illustrated in FIG. 13. So in this case, minimum differential path delay was increased to obtain adequate performance, keeping the bandwidth used constant. FIG. 18 shows the 3 dB bandwidth of the chirp signal of FIG. 17 to be about 9 MHz.

Figure 19:
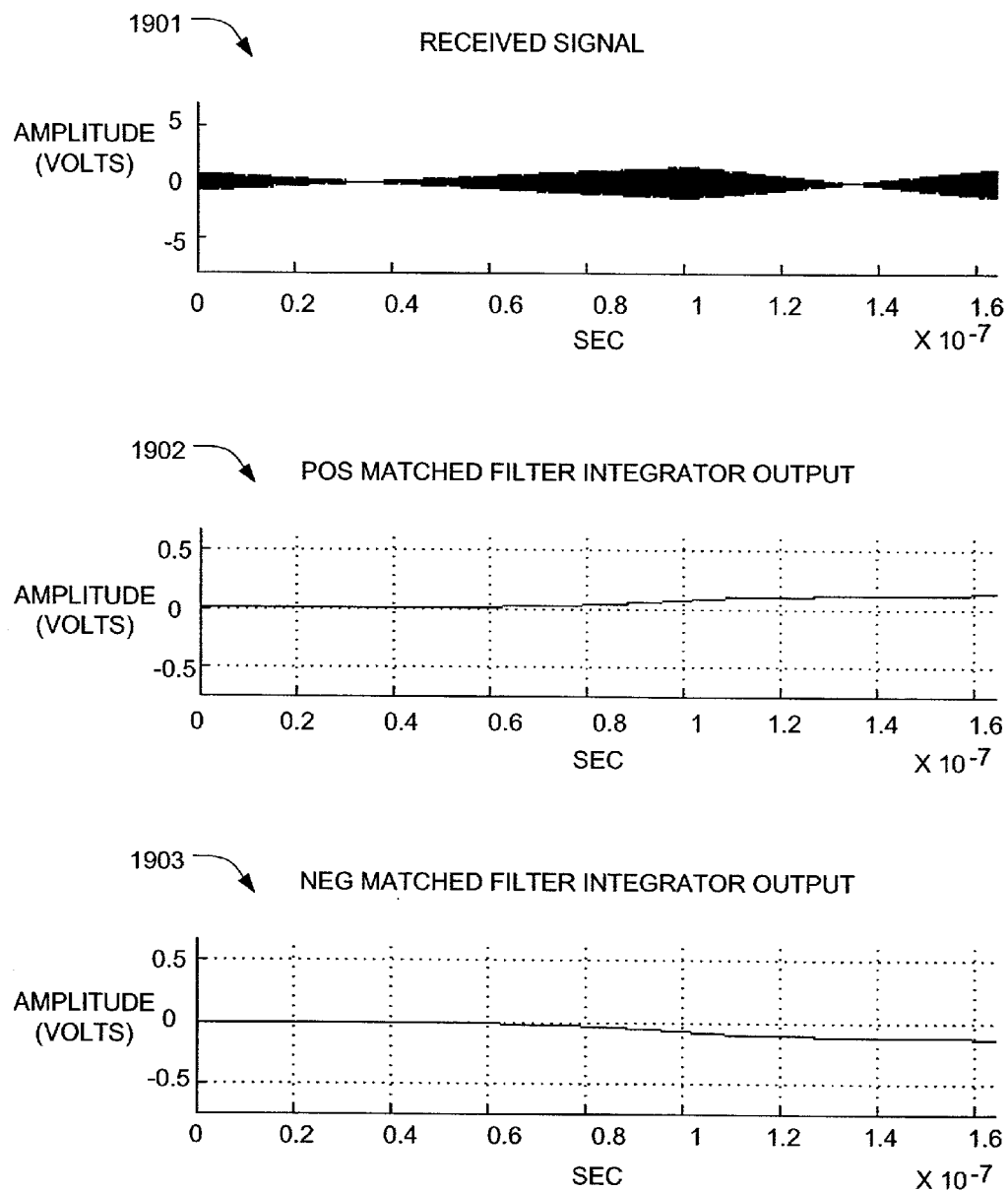
FIG. 19 shows yet another simulation of part of a chirp signal receiver according to one aspect of the present invention.

FIG. 19 shows a simulation of another chirp signal according to one aspect of the invention. The chirp signal is simulated with a 6 MHz baud rate, a chirp rate of 6 MHz in one baud time and a differential path delay of 30 meters. FIG. 19 shows the received signal 1901, the positive matched filter output 1902 and the negative matched filter output 1903. The simulation yields a matched filter output of about 0.1422, which is likely to be too low.

Figure 20:
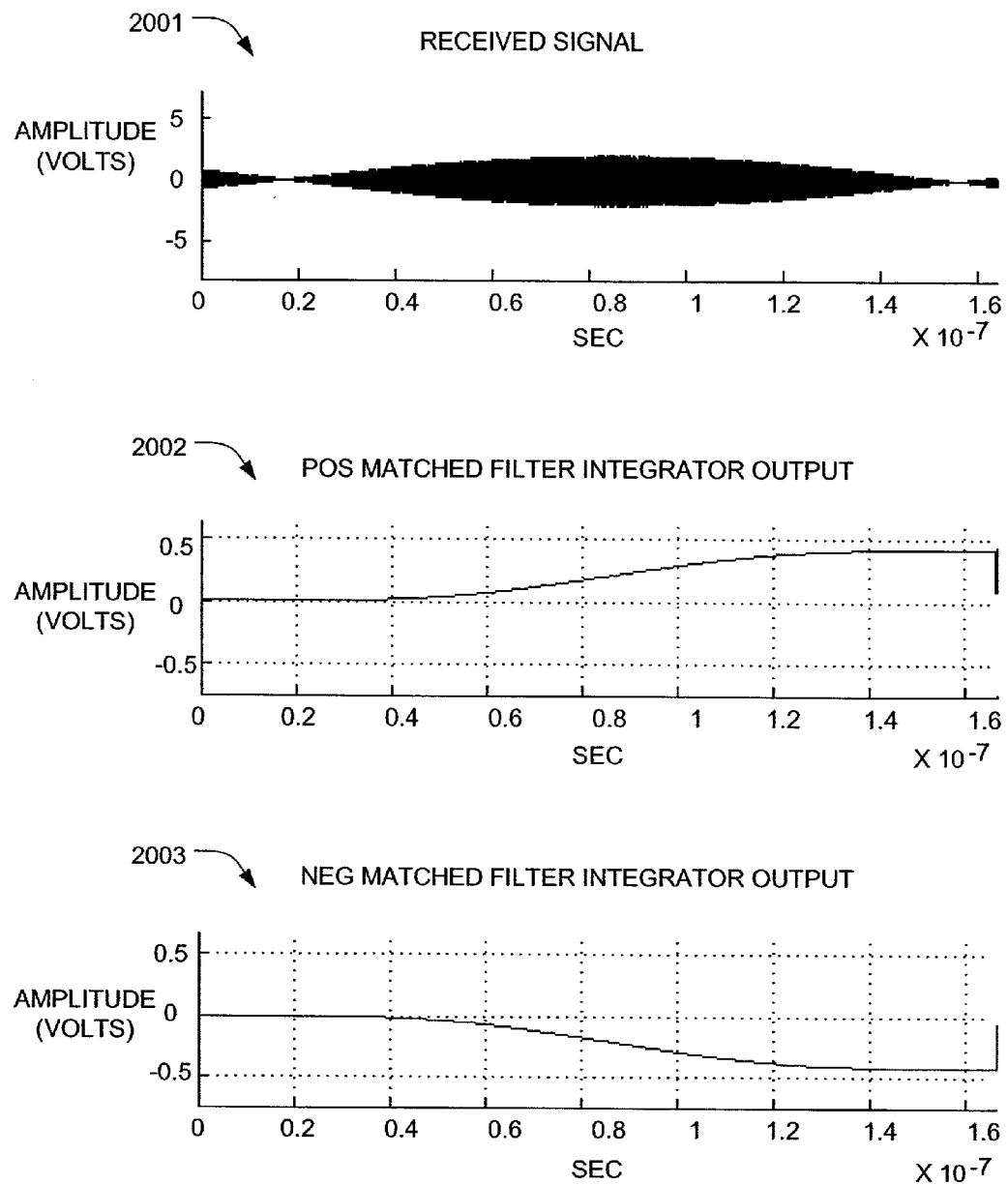
FIG. 20 shows a simulation of part of a chirp signal receiver according to one aspect of the present invention.
Figure 21:
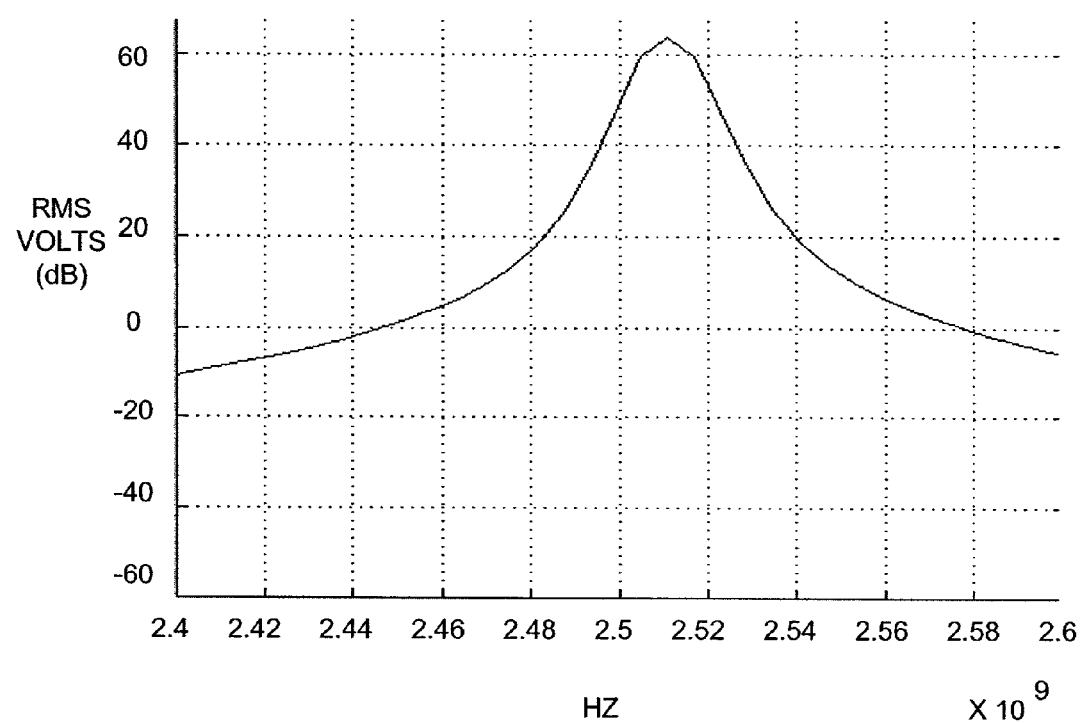
FIG. 21 shows a 3 dB bandwidth of a chirp signal according to one aspect of the present invention.

FIG. 20 shows a simulation of a chirp signal according to one aspect of the invention. The chirp signal is simulated with a 6 MHz baud rate, a chirp rate of 12 MHz in one baud time (2 times that of FIG. 19) and a differential path delay of 30 meters. FIG. 20 shows the received signal 2001, the positive matched filter output 2002 and the negative matched filter output 2003. The simulation yields a matched filter output of about 0.3903, which is likely to be acceptable. Thus, doubling the chirp rate caused the matched filter output to be acceptable. FIG. 21 shows the 3 dB bandwidth of the signal according to FIG. 20 to be about 10 MHz.

Figure 22:
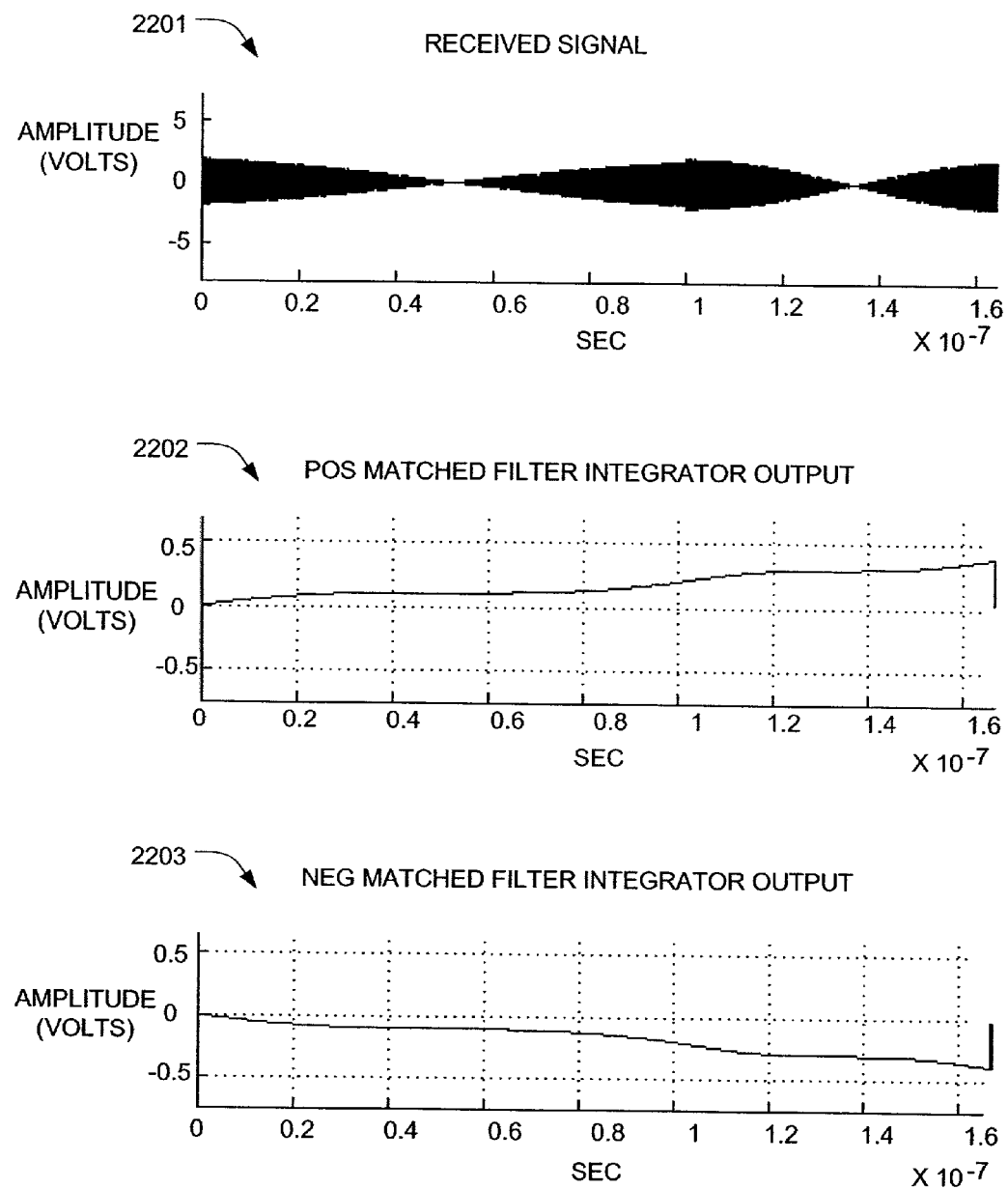
FIG. 22 shows a simulation of part of a chirp signal receiver according to one aspect of the present invention.

FIG. 22 shows a simulation of a chirp signal according to one aspect of the invention. The chirp signal is simulated with a 6 MHz baud rate, a chirp rate of 6 MHz in one baud time and a differential path delay of 60 meters. Thus, the differential path delay is increased from 30 meters for the chirp signal of FIG. 18 to 60 meters. FIG. 22 shows the received signal 2201, the positive matched filter output 2202 and the negative matched filter output 2203. The simulation yields a matched filter output of about 0.4213, which is likely to be acceptable. The tradeoff is either to increase the chirp rate or increase the minimum differential path delay to improve performance while remaining within the allowable bandwidth.

It is appreciated that the present invention is applicable to baud rates, available bandwidths, path delays and carrier frequencies other than that which is specifically described. Furthermore, the invention is equally applicable to a wide variety of communication systems such as, but not limited to, radio frequency (RF), optics, sonics and the like.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Although this invention was conceived to solve multipath problems in terrestrial environments it will also apply to non-atmospheric environments such as in outer space even for frequencies not practicable in atmospheric environments due to atmospheric attenuation. Accordingly, the present invention is intended to embrace all such alterations, modifications and variations that fall within the spirit and scope of the appended claims.

What is claimed is:

1. A communication system comprising:
   a base station operative to generate a chirp signal according to a chirp rate selected to reduce bandwidth usage and to reduce transmission errors, the base station being operative to transmit the chirp signal, the chirp signal being substantially orthogonal to delayed versions of the transmitted chirp signal; and
   a receiving station operative to receive an incoming signal, the incoming signal including the chirp signal.

2. The system of claim 1, the chirp signal being a relatively narrowband signal.

3. The system of claim 2, the incoming signal further comprising noise, multipath, and other signals and the receiving station removing the noise, multipath, and other signals from the incoming signal to obtain the chirp signal.

4. The system of claim 3, the base station further comprising a transmitter chirp generator to convert base station data to a digital chirp signal and a digital to analog converter to the digital chirp signal to the chirp signal.

5. The system of claim 4, the receiving station further comprising:
   an analog to digital converter to convert the incoming signal into a received digital signal; and
   a receiver matched filter matched according to the transmitter chirp generator, to remove unwanted signals from the received digital signal utilizing the chirp rate and to demodulate the chirp signal to obtain the base station data.

6. The system of claim 1, the chirp rate being dynamically modifiable.

7. The system of claim 1, the chirp rate being dynamically modifiable according to transmission errors and bandwidth usage.

8. A communication system comprising:
   means for creating a chirp signal such that delayed versions of the chirp signal are substantially orthogonal to the chirp signal;
   means for transmitting the chirp signal;
   means for receiving an incoming signal comprising the chirp signal; and
   means for removing unwanted signals from the incoming signal to obtain the chirp signal.

9. A receiver matched filter system comprising:
   a matched filter operative to receive an input signal and to demodulate the input signal according to a stored signal template to obtain a digital data signal, the input signal including a chirp signal, the chirp signal being relatively narrowband and substantially orthogonal to delayed versions of the chirp signal in the input signal; and a signal template generator operative to determine the signal template and to provide the signal template to the matched filter, the signal template including signal template parameters associated with the chirp signal.

10. The system of claim 9, the signal template parameters comprising a chirp rate, a modulation type, a carrier frequency and a baud time, the system further comprising:

a controller operative to detect transmission errors in the digital data signal and to modify the chirp rate, the modulation type, the baud time, and the carrier frequency based on the transmission errors.

11. The system of claim 10, the controller being further operative to track bandwidth usage and to modify at least one of the chirp rate, the modulation type, the baud time, and the carrier frequency based on the bandwidth usage.

12. The system of claim 11, the controller being further operative to generate feedback data based on the transmission errors and the bandwidth usage and to provide the feedback data to a base station.

13. A transceiver device comprising:

a transmitter chirp filter comprising:

a chirp rate determiner operative to determine a first chirp rate; and a signal converter operative to convert an input signal to a first chirp signal according to the first chirp rate and a first carrier frequency; and a receiver chirp filter comprising:

a receive filter operative to receive an input signal and to demodulate the input signal according to a second carrier frequency and a second chirp rate to obtain an analog signal, the input signal including a second chirp signal, the second chirp signal being relatively narrowband and substantially orthogonal to delayed versions of the second chirp signal; and a chirp rate component operative to determine the second chirp rate and provide the second chirp rate to the receive filter.

14. The transceiver device of claim 13, the first chirp rate and the first chirp signal being substantially equal to the second chirp rate and the second chirp signal.

15. The transceiver device of claim 13, the first chirp rate and the second chirp rate selected to reduce transmission errors and bandwidth usage.

16. A method of operating a communications system comprising:

determining at least one of a chirp rate, baud time, carrier frequency, and modulation;

generating a digital chirp signal according to the at least one of chirp rate, baud time, carrier frequency, and modulation; and transmitting the digital chirp signal, the transmitted chirp signal being substantially orthogonal to delayed versions of the transmitted chirp signal.

17. A method of operating a communications system comprising:

determining at least one of a chirp rate, baud time, carrier frequency, and modulation:

generating a digital chirp signal according to the at least one of chirp rate, baud time, carrier frequency, and modulation; and transmitting the digital chirp signal, the transmitted chirp signal being substantially orthogonal to delayed versions of the transmitted chirp signal, wherein determining the chirp rate comprises:

selecting transmission parameters based on a desired implementation, the transmission parameters including the carrier frequency, sampling rate, available bandwidth, minimum path delay, and baud rate;

selecting an estimated chirp rate based on the transmission parameters;

simulating transmission of a simulated chirp signal based on the transmission parameters to obtain a simulation result;

on the simulation result being acceptable, providing the estimated chirp rate as the chirp rate; and on the simulation result being unacceptable, modifying the estimated chirp rate.

18. The method of claim 17, further comprising converting the digital chirp signal to an analog chirp signal and transmitting the analog chirp signal.

19. The method of claim 18, further comprising:

receiving an incoming signal, the incoming signal including the digital chirp signal;

removing noise from the incoming signal;

downconverting the incoming signal; and performing an analog to digital conversion on the incoming signal.

20. The method of claim 19, further comprising:

removing multipath signals, noise, and unwanted signals from the incoming signal; and demodulating the incoming signal to obtain digital data.

21. A method of simulating a chirp signal comprising:

determining transmission parameters for a desired implementation, the transmission parameters including an estimated chirp rate and a differential path delay;

generating a desired signal from the transmission parameters such that delayed versions of the desired signal are substantially orthogonal to the desired signal;

generating at least one delayed signal from the desired signal, where the at least delayed signal is a delayed version of the desired signal; and generating a nearly worst case delayed signal from the desired signal, where the nearly worst case delayed signal is a nearly worst case delayed version of the desired signal;

simulating transmission and reception of the desired signal, the at least one delayed signal and the nearly worst case delayed signal; and determining acceptability of the estimated chirp rate.

22. The method of claim 21, further comprising:

on the estimated chirp rate being not acceptable, modifying the transmission parameters and re-performing the transmission simulation.

23. The method of claim 21, the transmission parameters further including carrier frequency and baud time.

24. The method of claim 21, the acceptability determined by computing a matched filter output.

25. The method of claim 21, the nearly worst case signal being generated about 180 degrees out of phase from the desired signal.

* * * * *